US012804392B2

(12) United States Patent
Kim et al.

(10) Patent No.: US 12,804,392 B2
(45) Date of Patent: Nov. 17, 2026

(54) METHOD AND APPARATUS FOR PERFORMING LINK RECONFIGURATION BETWEEN MLDs IN WIRELESS LAN SYSTEM

(71) Applicant: LG ELECTRONICS INC., Seoul (KR)

(72) Inventors: Namyeong Kim, Seoul (KR); Jeongki Kim, Seoul (KR); Jinsoo Choi, Seoul (KR); Taewon Song, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 633 days.

(21) Appl. No.: 18/009,693

(22) PCT Filed: Jun. 4, 2021

(86) PCT No.: PCT/KR2021/007037
§ 371 (c)(1),
(2) Date: Dec. 9, 2022

(87) PCT Pub. No.: WO2021/251696
PCT Pub. Date: Dec. 16, 2021

(65) Prior Publication Data

US 2023/0224996 A1 Jul. 13, 2023

(30) Foreign Application Priority Data

Jun. 9, 2020 (KR) ........................ 10-2020-0069741
Jun. 15, 2020 (KR) ........................ 10-2020-0072574

(51) Int. Cl.
*H04W 12/06* (2021.01)
*H04W 76/15* (2018.01)
(Continued)

(52) U.S. Cl.
CPC ........... *H04W 12/06* (2013.01); *H04W 76/15* (2018.02); *H04W 76/20* (2018.02); *H04W 84/12* (2013.01)

(58) Field of Classification Search
CPC ..... H04W 12/06; H04W 76/15; H04W 76/20; H04W 84/12; H04W 76/11
See application file for complete search history.

(56) References Cited

U.S. PATENT DOCUMENTS

2019/0082373 A1* 3/2019 Cherian ................ H04L 1/1614
2019/0150214 A1 5/2019 Zhou et al.
(Continued)

OTHER PUBLICATIONS

Namyeong Kim, et al., "MLO: Information Exchange for Link switching", doc.: IEEE 802.11-20/0411r0, Mar. 2020, 12 pages.
(Continued)

*Primary Examiner* — Gary Mui
(74) *Attorney, Agent, or Firm* — LEE, HONG, DEGERMAN, KANG & WAIMEY

(57) ABSTRACT

Proposed are a method and apparatus for performing, by reception MLD, link reconfiguration with transmission MLD, in a wireless LAN system. In detail, the reception MLD transmits a link change request frame to the transmission MLD via a first link. The reception MLD receives a link change response frame from the transmission MLD via the first link. The reception MLD configures a second link with the transmission MLD, on the basis of the link change response frame. The transmission MLD comprises a first transmission STA operating in the first link and a second transmission STA operating in the second link. The reception MLD comprises a first reception STA having a link changed from the first link to the second link. The link change response frame comprises information about the first and second links. The information about the second link is
(Continued)

updated. The information about the first link is maintained without being reset or deleted.

9 Claims, 31 Drawing Sheets

(51) Int. Cl.
*H04W 76/20* (2018.01)
*H04W 84/12* (2009.01)

(56) References Cited

U.S. PATENT DOCUMENTS

| | | | | |
|---|---|---|---|---|
| 2019/0158385 | A1* | 5/2019 | Patil | H04W 76/15 |
| 2019/0335454 | A1 | 10/2019 | Huang et al. | |
| 2022/0417857 | A1* | 12/2022 | Guo | H04W 52/028 |
| 2023/0043522 | A1* | 2/2023 | Li | H04W 52/0206 |

OTHER PUBLICATIONS

Taewon Song, et al., "Multi-link Management", doc.: IEEE 802.11-19/1943r4, Jun. 2020, 17 pages.
Jeongki Kim, et al., "EHT Power saving considering multi-link", doc.: IEEE 802.11-19/1510r1, Nov. 2019, 17 pages.
PCT International Application No. PCT/KR2021/007037, International Search Report dated Sep. 9, 2021, 4 pages.

* cited by examiner

FIG. 12

| Multi-link STA | | |
|---|---|---|
| 5GHz | 6GHz | |
| STA 1<br>Link 1 | STA 2<br>Link 2 | STA 3<br>Link 3 |

METHOD AND APPARATUS FOR PERFORMING LINK RECONFIGURATION BETWEEN MLDs IN WIRELESS LAN SYSTEM

CROSS-REFERENCE TO RELATED APPLICATIONS

This application is the National Stage filing under 35 U.S.C. 371 of International Application No. PCT/KR2021/007037, filed on Jun. 4, 2021, which claims the benefit of earlier filing date and right of priority to Korean Application Nos. 10-2020-0069741, filed on Jun. 9, 2020, and 10-2020-0072574, filed on Jun. 15, 2020, the contents of which are all incorporated by reference herein in their entirety.

TECHNICAL FIELD

The present specification relates a multi-link operation in a wireless local area network (WLAN) system and, most particularly, to a method and apparatus for performing link reconfiguration between MLDs.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for performing link reconfiguration between MLDs in a WLAN system.

An example of this specification proposes a method in which a receiving MLD performs link reconfiguration with a transmitting MLD.

The present embodiment may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

The present embodiment proposes a method and apparatus for exchanging link change frames while maintaining existing values for links that have not changed while including information on only the changed links when some links are changed (link switching) between MLDs.

a receiving Multi-link Device (MLD) transmits a link change request frame to a transmitting MLD through a first link.

The receiving MLD receives a link change response frame from the transmitting MLD through the first link.

The receiving MLD configures a second link with the transmitting MLD based on the link change response frame.

The transmitting MLD includes a first transmitting station (STA) operating on the first link and a second transmitting STA operating on the second link. The receiving MLD includes a first receiving STA whose operating link is changed from the first link to the second link. That is, the first receiving STA operates in the first link when transmitting and receiving the link change request frame and the link change response frame, an operating link is changed from the first link to the second link based on the information included in the link change response frame.

The link change response frame includes information on the first and second links. At this time, the information on the second link is updated, and the information on the first link is maintained without being reset or deleted. Previously, if some links of MLD are changed, not only for the receiving STA where the link change occurs, but also for the receiving STA that does not change the link within the same receiving MLD, some attributes (e.g., status, agreement, assignment) must be reset or deleted and link reconnection must be performed, resulting in inefficiency.

However, the present embodiment proposes a method of performing link change by exchanging minimum frames (or information) between the transmitting MLD and the receiving MLD by updating and including only the information on the changed link while maintaining the existing value of the information on the link that does not change.

According to the embodiment proposed in this specification, by exchanging a minimum frame (or information) between a transmitting MLD and a receiving MLD to perform a link change, there is an effect of reducing overhead for exchanging frames or information that may occur unnecessarily.

BRIEF DESCRIPTION OF THE DRAWINGS

FIG. 12 shows an example of a structure of a non-AP MLD.

DETAILED DESCRIPTION

Figure 1:
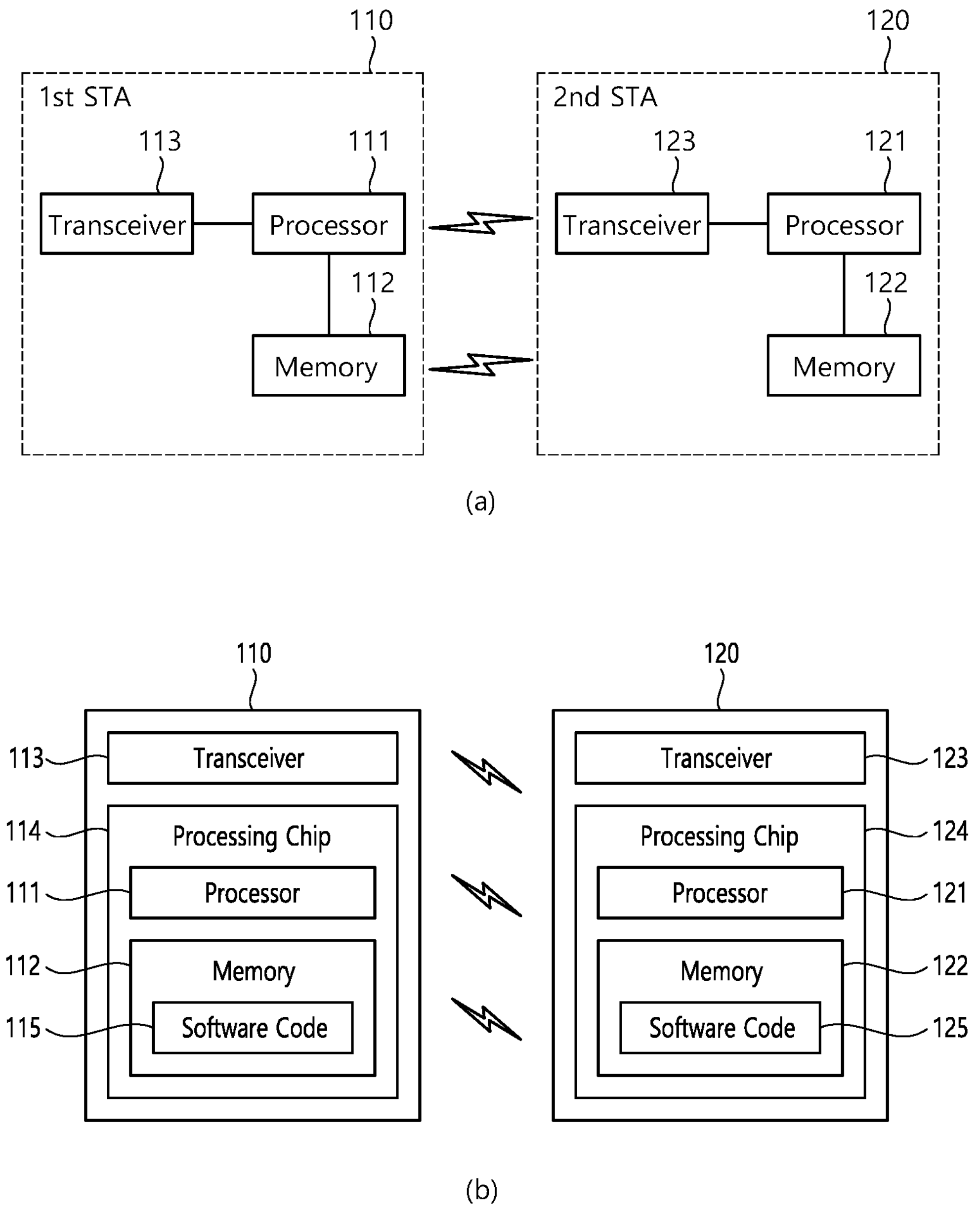
FIG. 1 shows an example of a transmitting apparatus and/or receiving apparatus of the present specification.

In the present specification, “A or B” may mean “only A”, “only B” or “both A and B”. In other words, in the present specification, “A or B” may be interpreted as “A and/or B”. For example, in the present specification, “A, B, or C” may mean “only A”, “only B”, “only C”, or “any combination of A, B, C”.

A slash (/) or comma used in the present specification may mean “and/or”. For example, “A/B” may mean “A and/or B”. Accordingly, “A/B” may mean “only A”, “only B”, or “both A and B”. For example, “A, B, C” may mean “A, B, or C”.

In the present specification, “at least one of A and B” may mean “only A”, “only B”, or “both A and B”. In addition, in the present specification, the expression “at least one of A or B” or “at least one of A and/or B” may be interpreted as “at least one of A and B”.

In addition, in the present specification, “at least one of A, B, and C” may mean “only A”, “only B”, “only C”, or “any combination of A, B, and C”. In addition, “at least one of A, B, or C” or “at least one of A, B, and/or C” may mean “at least one of A, B, and C”.

In addition, a parenthesis used in the present specification may mean “for example”. Specifically, when indicated as “control information (EHT-signal)”, it may denote that “EHT-signal” is proposed as an example of the “control information”. In other words, the “control information” of the present specification is not limited to “EHT-signal”, and “EHT-signal” may be proposed as an example of the “control information”. In addition, when indicated as “control information (i.e., EHT-signal)”, it may also mean that “EHT-signal” is proposed as an example of the “control information”.

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3$^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11 a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
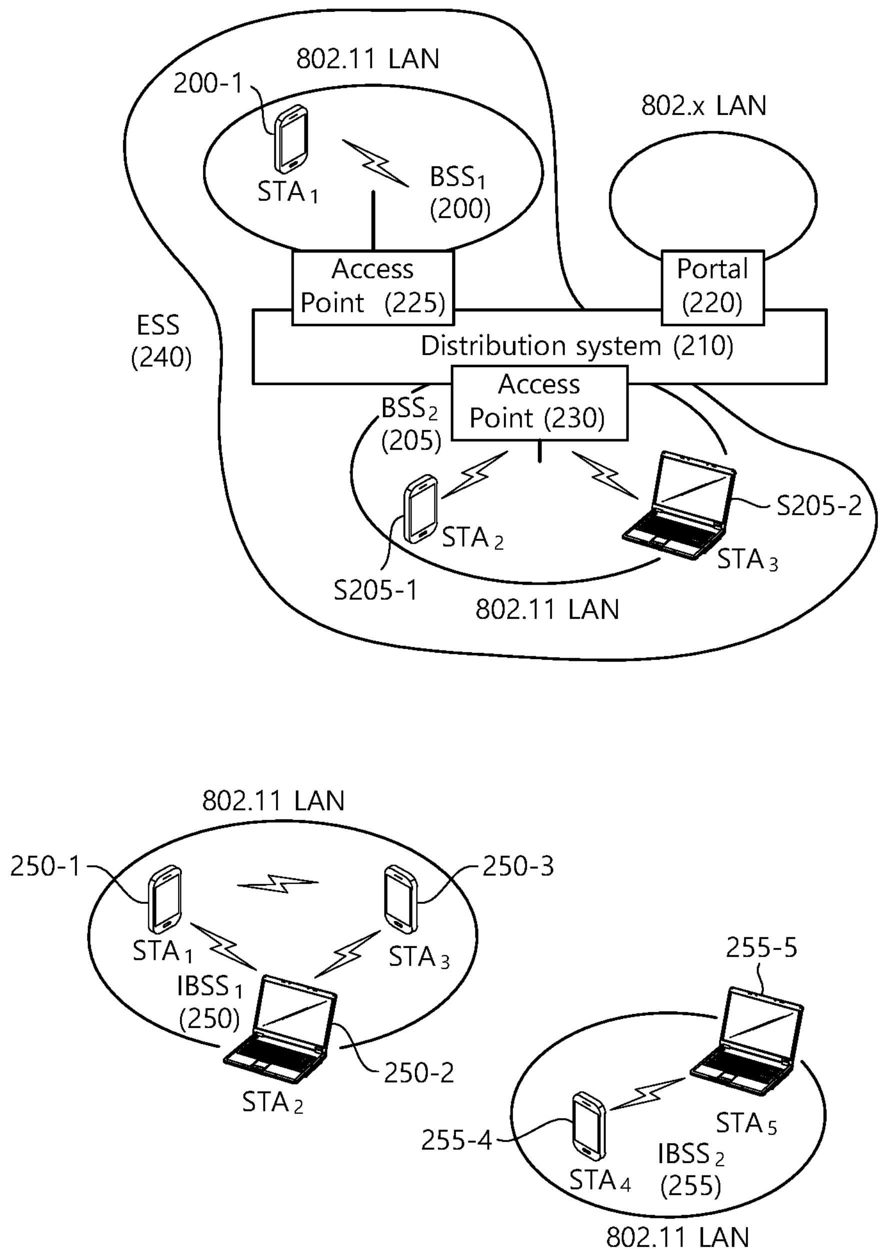
FIG. 2 is a conceptual view illustrating the structure of a wireless local area network (WLAN).

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
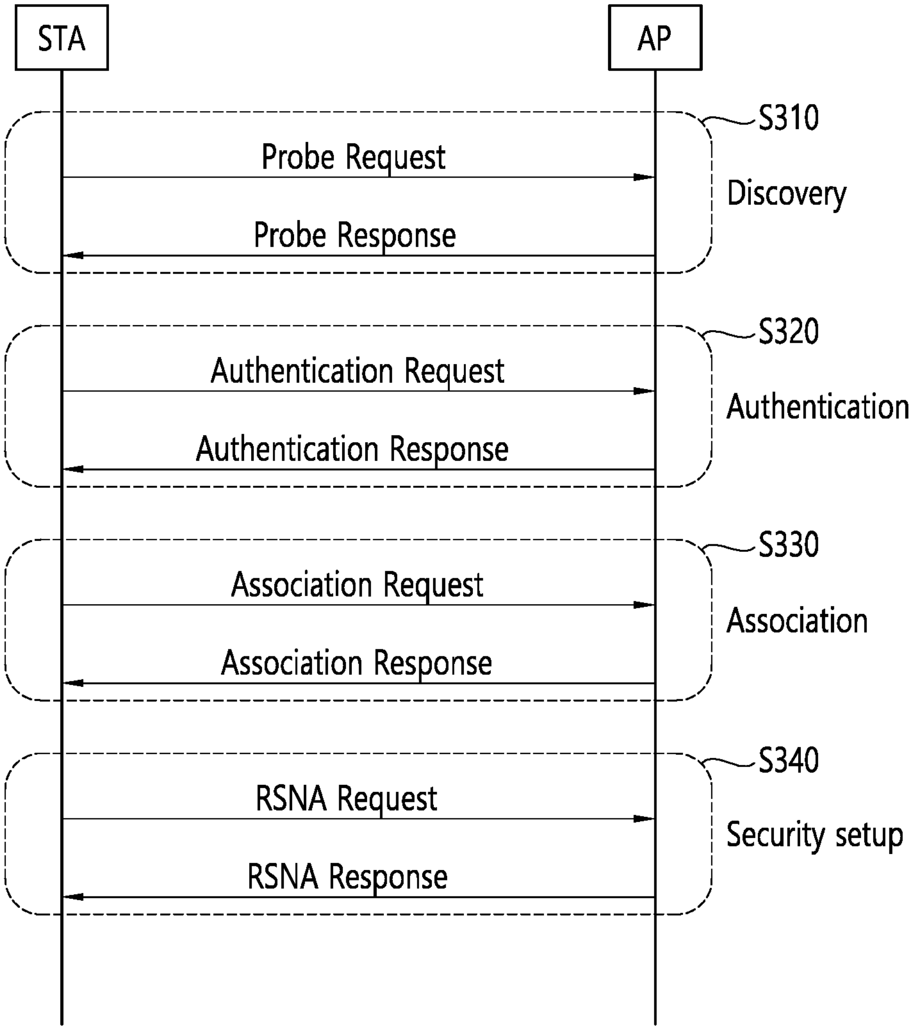
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
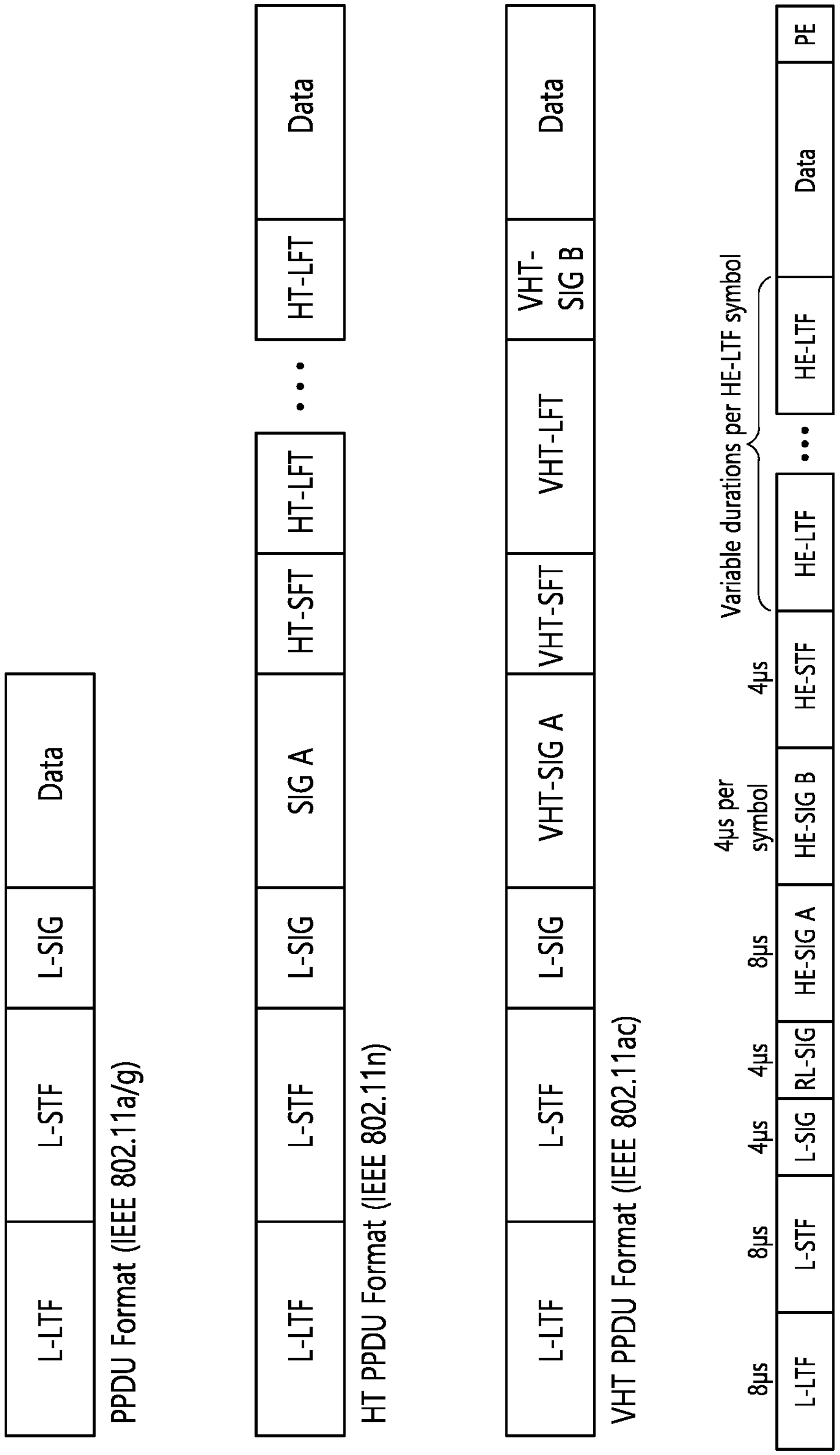
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Figure 5:
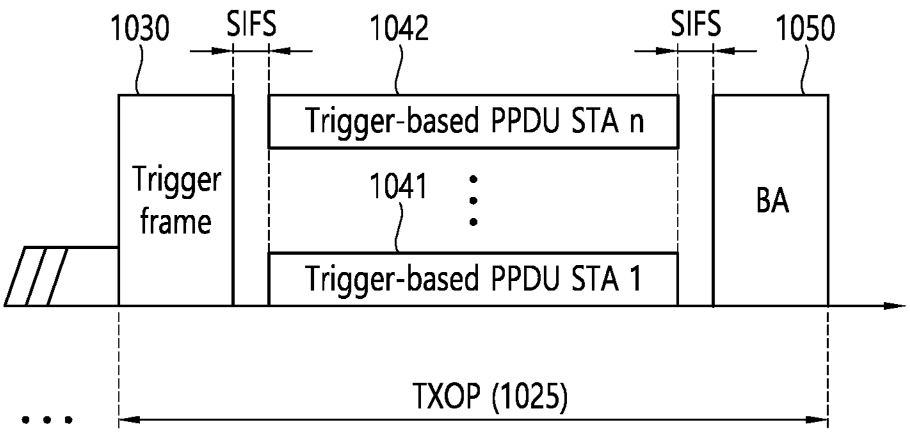
FIG. 5 illustrates an operation based on UL-MU.

FIG. 5 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 6 to FIG. 8. Even if UL-MU communication is used, an orthogonal frequency division multiple access (OFDMA) scheme or a MU MIMO scheme may be used, and the OFDMA and MU-MIMO schemes may be simultaneously used.

Figure 6:
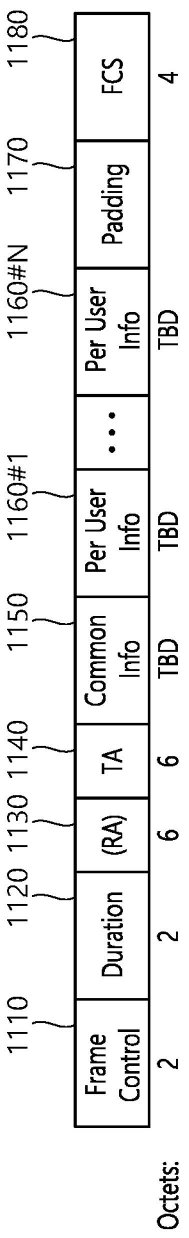
FIG. 6 illustrates an example of a trigger frame.

FIG. 6 illustrates an example of a trigger frame. The trigger frame of FIG. 6 allocates a resource for uplink multiple-user (MU) transmission, and may be transmitted, for example, from an AP. The trigger frame may be configured of a MAC frame, and may be included in a PPDU.

Each field shown in FIG. 6 may be partially omitted, and another field may be added. In addition, a length of each field may be changed to be different from that shown in the figure.

A frame control field 1110 of FIG. 6 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 6 are preferably included. The per user information field may also be called an "allocation field".

In addition, the trigger frame of FIG. 6 may include a padding field 1170 and a frame check sequence field 1180.

Each of the per user information fields 1160 #1 to 1160 #N shown in FIG. 6 may include a plurality of subfields.

Figure 7:
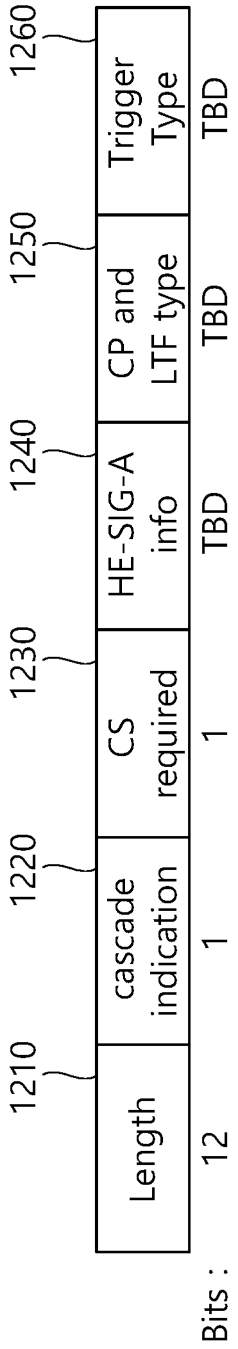
FIG. 7 illustrates an example of a common information field of a trigger frame.

FIG. 7 illustrates an example of a common information field of a trigger frame. A subfield of FIG. 7 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 8:
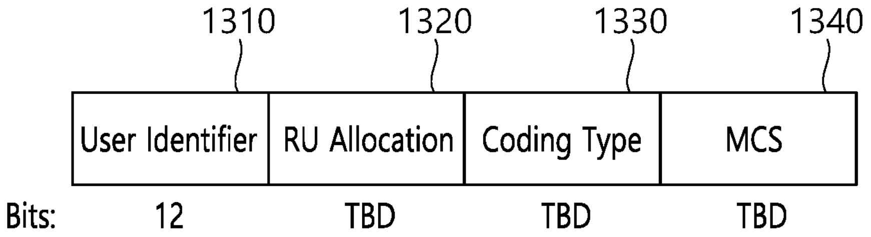
FIG. 8 illustrates an example of a subfield included in a per user information field.

FIG. 8 illustrates an example of a subfield included in a per user information field. A user information field 1300 of FIG. 8 may be understood as any one of the per user information fields 1160 #1 to 1160 #N mentioned above with reference to FIG. 6. A subfield included in the user information field 1300 of FIG. 8 may be partially omitted, and an extra subfield may be added. In addition, a length of each subfield illustrated may be changed.

A user identifier field 1310 of FIG. 8 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320.

The subfield of FIG. 8 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 8 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 9:
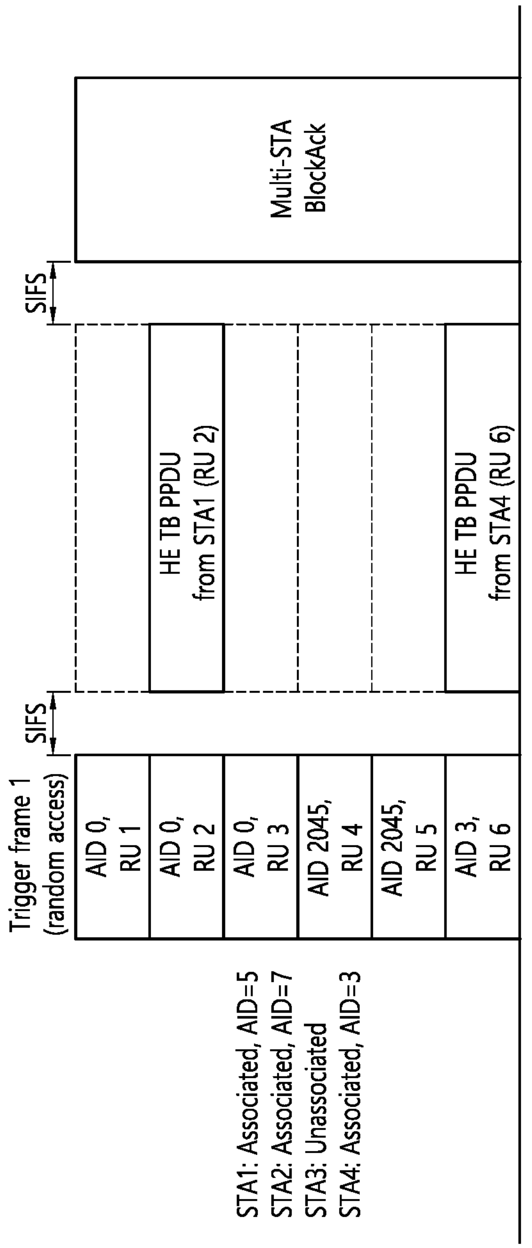
FIG. 9 describes a technical feature of the UORA scheme.

FIG. 9 describes a technical feature of the UORA scheme.

A transmitting STA (e.g., an AP) may allocate six RU resources through a trigger frame as shown in FIG. 9. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 8. Information related to the RU 1 to RU 6 may be included, for example, in the RU allocation field 1320 of FIG. 8. AID=0 may imply a UORA resource for an associated STA, and AID=2045 may imply a UORA resource for an un-associated STA. Accordingly, the 1st to 3rd RU resources of FIG. 9 may be used as a UORA resource for the associated STA, the 4th and 5th RU resources of FIG. 9 may be used as a UORA resource for the un-associated STA, and the 6th RU resource of FIG. 9 may be used as a typical resource for UL MU.

In the example of FIG. 9, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 9, since an AID (e.g., AID=3) of the STA4 is included in a trigger frame, a resource of the RU 6 is allocated without backoff.

Specifically, since the STA1 of FIG. 9 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 9 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 9 is an un-associated STA, the total number of eligible RA RUs for the STA3 is 2 (RU 4, RU 5), and thus the STA3 decreases the OBO counter by 2 but the OBO counter is greater than 0.

Hereinafter, a PPDU transmitted/received in a STA of the present specification will be described.

Figure 10:
FIG. 10 illustrates an example of a PPDU used in the present specification.

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3" +1 or "a multiple of 3" +2. In other words, for the non-HT, HT, VHT PPDI or the EHT PPDU, the value of the length field may be determined as a multiple of 3, and for the HE PPDU, the value of the length field may be determined as "a multiple of 3" +1 or "a multiple of 3" +2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
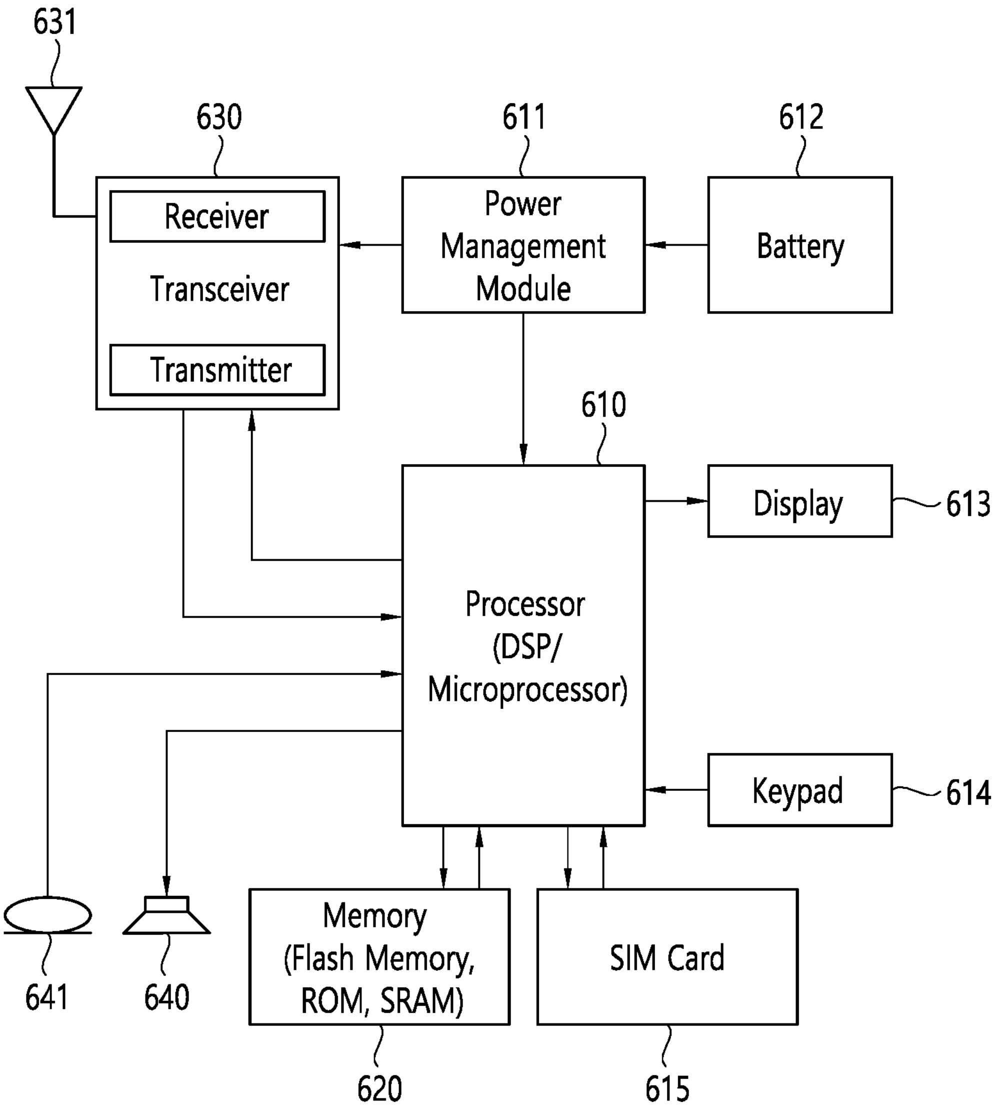
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

Hereinafter, technical features of multi-link (ML) supported by the STA of the present specification will be described.

STAs (AP and/or non-AP STA) of the present specification may support multi-link (ML) communication. ML communication may mean communication supporting a plurality of links. Links related to ML communication may include channels (e.g., 20/40/80/160/240/320 MHz channels) of the 2.4 GHz band, the 5 GHz band, and the 6 GHz band.

A plurality of links used for ML communication may be set in various ways. For example, a plurality of links supported by one STA for ML communication may be a plurality of channels in the 2.4 GHz band, a plurality of channels in the 5 GHz band, and a plurality of channels in the 6 GHz band. Alternatively, a plurality of links may be a combination of at least one channel within the 2.4 GHz band (or 5 GHz/6 GHz band) and at least one channel within the 5 GHz band (or 2.4 GHz/6 GHz band). Meanwhile, at least one of a plurality of links supported by one STA for ML communication may be a channel to which preamble puncturing is applied.

The STA may perform ML setup to perform ML communication. ML setup may be performed based on management frames or control frames such as Beacon, Probe Request/Response, and Association Request/Response. For example, information on ML setup may be included in element fields included in Beacon, Probe Request/Response, and Association Request/Response.

When ML setup is completed, an enabled link for ML communication may be determined. The STA may perform frame exchange through at least one of a plurality of links determined as an enabled link. For example, an enabled link may be used for at least one of a management frame, a control frame, and a data frame.

When one STA supports a plurality of Links, a transmitting/receiving device supporting each Link may operate like one logical STA. For example, one STA supporting two links may be expressed as one ML device (Multi Link Device; MLD) including a first STA for a first link and a second STA for a second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

More specific features of the ML setup are described below.

An MLD (AP MLD and/or non-AP MLD) may transmit information about a link that the corresponding MLD can support through ML setup. Link-related information may be configured in various ways. For example, link-related information includes at least one of 1) information on whether the MLD (or STA) supports simultaneous RX/TX operation, 2) information on the number/upper limit of uplink/downlink links supported by the MLD (or STA), 3) information on the location/band/resource of uplink/downlink link supported by MLD (or STA), 4) type of frame available or preferred in at least one uplink/downlink link (management, control, data etc.), 5) available or preferred ACK policy information on at least one uplink/downlink link, and 6) information on available or preferred TID (traffic identifier) on at least one uplink/downlink link. The TID is related to the priority of traffic data and is represented by 8 types of values according to the conventional wireless LAN standard. That is, 8 TID values corresponding to 4 access categories (AC) (AC_BK (background), AC_BE (best effort), AC_VI (video), AC_VO (voice)) according to the conventional wireless LAN standard may be defined.

For example, it may be set in advance that all TIDs are mapped for uplink/downlink links. Specifically, if negotiation is not done through ML setup, all TIDs may be used for ML communication, and if mapping between uplink/downlink links and TIDs is negotiated through additional ML setup, the negotiated TIDs may be used for ML communication.

A plurality of links that can be used by the transmitting MLD and the receiving MLD related to ML communication can be set through ML setup, and this can be called an enabled link. The enabled link can be called differently in a variety of ways. For example, it may be called various expressions such as a first link, a second link, a transmitting link, and a receiving link.

After the ML setup is complete, the MLD may update the ML setup. For example, the MLD may transmit information about a new link when updating information about a link is required. Information about the new link may be transmitted based on at least one of a management frame, a control frame, and a data frame.

The device described below may be the apparatus of FIGS. 1 and/or 11, and the PPDU may be the PPDU of FIG. 10. A device may be an AP or a non-AP STA. A device described below may be an AP multi-link device (MLD) or a non-AP STA MLD supporting multi-link.

In EHT (extremely high throughput), a standard being discussed after 802.11 ax, a multi-link environment in which one or more bands are simultaneously used is considered. When a device supports multi-link, the device can simultaneously or alternately use one or more bands (e.g., 2.4 GHz, 5 GHz, 6 GHz, 60 GHz, etc.).

In the following specification, MLD means a multi-link device. The MLD has one or more connected STAs and has one MAC service access point (SAP) that communicates with the upper link layer (Logical Link Control, LLC). MLD may mean a physical device or a logical device. Hereinafter, a device may mean an MLD.

In the following specification, a transmitting device and a receiving device may mean MLD. The first link of the receiving/transmitting device may be a terminal (e.g., STA or AP) included in the receiving/transmitting device and performing signal transmission/reception through the first link. The second link of the receiving/transmitting device may be a terminal (e.g., STA or AP) that transmits/receives a signal through the second link included in the receiving/transmitting device.

In IEEE802.11be, two types of multi-link operations can be supported. For example, simultaneous transmit and receive (STR) and non-STR operations may be considered. For example, STR may be referred to as asynchronous multi-link operation, and non-STR may be referred to as synchronous multi-link operation. Multi-links may include multi-bands. That is, multi-links may mean links included in several frequency bands or may mean multiple links included in one frequency band.

EHT (11be) considers multi-link technology, where multi-link may include multi-band. That is, multi-link can represent links of several bands and multiple multi-links within one band at the same time. Two major multi-link operations are being considered. Asynchronous operation, which enables TX/RX simultaneously on several links, and synchronous operation, which is not possible, are being considered. Hereinafter, a capability that enables simultaneous reception and transmission on multiple links is referred to as STR (simultaneous transmit and receive), an STA having STR capability is referred to as STR MLD (multi-link device), and an STA that does not have STR capability is referred to as a non-STR MLD.

FIG. 12 shows an example of a structure of a non-AP MLD.

Referring to FIG. 12, a non-AP MLD may be configured with a plurality of links. In other words, a non-AP MLD can support multiple links. A non-AP MLD may include a plurality of STAs. A plurality of STAs may have Link for each STA. Although FIG. 12 shows an example of a non-AP MLD structure, the structure of the AP MLD may also be configured identically to the example of the structure of the non-AP MLD shown in FIG. 12.

For example, the non-AP MLD may include STA 1, STA 2, and STA 3. STA 1 can operate on link 1. link 1 may be included in the 5 GHz band. STA 2 can operate on link 2. link 2 may be included in the 6 GHz band. STA 3 can operate on link 3. link 3 may be included in the 6 GHz band. Bands included in link 1/2/3 are exemplary and may be included in 2.4, 5, and 6 GHz.

As such, in the case of an AP/non-AP MLD supporting multi-link, each AP of the AP MLD and each STA of the non-AP MLD may be connected to each link through a link setup process. And at this time, the connected link can be changed or reconnected to another link by AP MLD or non-AP MLD depending on the situation.

In addition, in the EHT standard, a link may be classified as an anchored link or a non-anchored link in order to reduce power consumption. An anchored link or non-anchored link can be called variously. For example, an anchored link may be referred to as a primary link. A non-Anchored Link can be called a Secondary link.

According to an embodiment, an AP MLD supporting multi-link can be managed by designating each link as an anchored link or a non-anchored link. The AP MLD may support one or more links among a plurality of links as an anchored link. A non-AP MLD can use it by selecting one or more of its own anchored links from the Anchored Link List (list of anchored links supported by the AP MLD).

For example, Anchored Link can be used for non-data frame exchange (i.e. Beacon and Management frame) as well as frame exchange for synchronization. Also, non-anchored links can only be used for data frame exchange.

The non-AP MLD can monitor only the anchored link for receiving beacons and management frames during the idle period. Therefore, in the case of non-AP MLD, at least one anchored link must be connected to receive beacon and management frame. The one or more Anchored Links must always maintain an enable state. In contrast, non-anchored links are used only for data frame exchange. Accordingly, an STA corresponding to a non-anchored link (or an STA connected to a non-anchored link) may enter doze during an idle period not using a channel/link. This has the effect of reducing power consumption.

Therefore, in the following specification, a protocol for recommending or requesting link reconnection by an AP MLD or a non-AP MLD dynamically according to circumstances may be proposed for efficient link connection. In addition, in the following specification, an anchored link reconnection protocol considering characteristics of an anchored link used for the purpose of power reduction as well as a general link may be additionally proposed.

Example for Link Change and Reconnection

According to an embodiment, each link between an AP MLD and anon-AP MLD may be determined in an Association or (re)Association process. At this time, the AP MLD and the non-AP MLD can perform frame exchange through the connected Link. A specific embodiment in which an AP MLD and a non-AP MLD are connected through a link setup process can be described with reference to FIG. 13.

Figure 13:
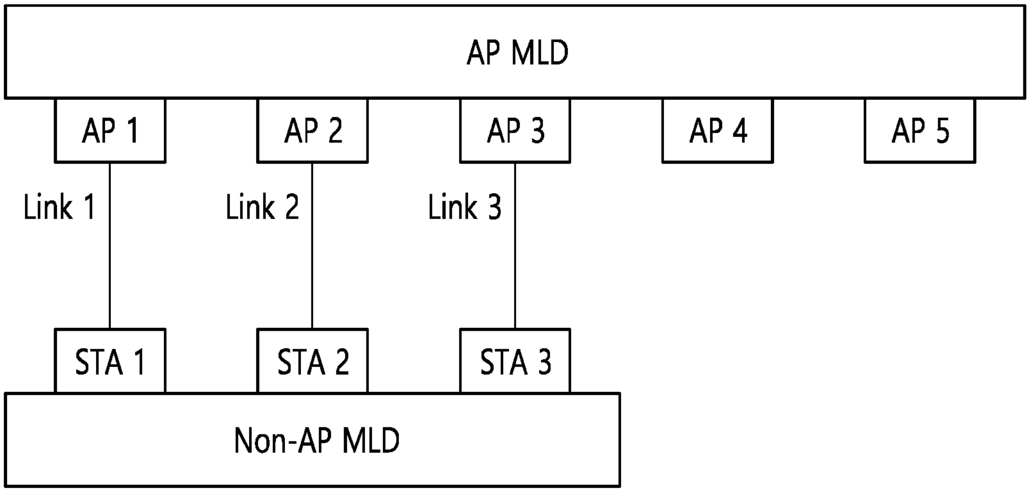
FIG. 13 illustrates an example in which an AP MLD and a non-AP MLD are connected through a link setup process.

FIG. 13 illustrates an example in which an AP MLD and a non-AP MLD are connected through a link setup process.

Referring to FIG. 13, the AP MLD may include AP 1, AP 2, AP 3, AP 4, and AP 5. The non-AP MLD may include STA 1, STA 2, and STA 3. AP 1 and STA 1 may be connected through link 1. AP 2 and STA 2 may be connected through link 2. AP 3 and STA 3 may be connected through link 3. The AP MLD and the non-AP MLD may be connected through link 1 to link 3 based on one link setup process or each link setup process.

As described above, each AP and STA may perform frame exchange through the connected Link. In addition, information of other APs on a different link or other STAs on a different link may be transmitted and received through one link.

However, after this link setup process, the AP MLD or non-AP MLD may request link change or reconnection for more efficient frame exchange (e.g., load balancing or interference avoiding, etc.) depending on the situation/environment.

An embodiment of link change or reconnection may be described with reference to FIG. 14.

Figure 14:
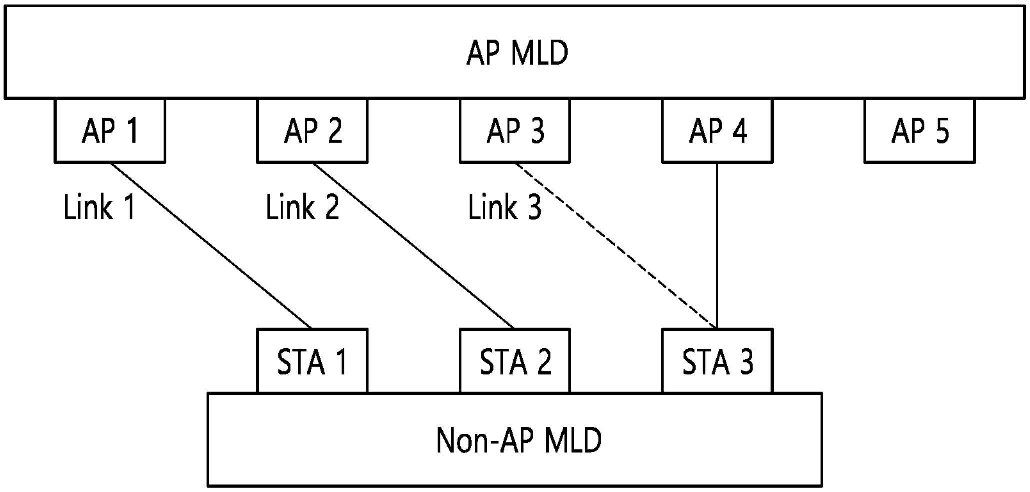
FIG. 14 illustrates an example in which Link is changed or reconnected.

FIG. 14 illustrates an example in which Link is changed or reconnected.

Referring to FIG. 14, conventionally, STA 3 is connected to AP 3. Thereafter, data load of AP 3 may be excessive. STA 3 may be reconnected to AP 4 having a relatively small data load. In this case, there is an effect that the AP MLD and the non-AP MLD can perform efficient data exchange.

According to an embodiment, the non-AP MLD and the AP MLD may request link transition to improve performance. The AP MLD and the non-AP MLD can transmit/receive/exchange various information and link state information for each current link. Therefore, the AP MLD and the non-AP MLD can select a link more suitable for transmitting and receiving signals based on various information and link states for each current link, and can transmit the above-described information to help the selection. For example, various types of information for each current link may include information about data traffic load for each link and channel access capability between links. For example, a link state may be set to disable or enable.

In the following specification, the process of negotiating with the non-AP MLD/AP MLD to request a change or reconnection to a link other than the link to which the AP MLD/non-AP MLD is connected to improve performance may be referred to as “Link switching negotiation”. The name of the “Link switching negotiation” may be called variously, and may be changed.

In the link switching negotiation process, the non-AP MLD (or AP MLD) requests to change the Link connected to a specific STA to another Link, and the AP MLD (or non-AP MLD) may respond to this request through a request acceptance or rejection message.

For example, as shown in FIG. 14, when link change is agreed upon through link switching negotiation, the STA may perform a link re-setup process in which the existing link is changed from AP 3 to AP 4 and reconnected.

Hereinafter, a link change or reconnection process may be described by dividing into a case requested by an AP MLD and a case requested by a non-AP MLD.

An Embodiment in which the AP MLD Requests Link Change or Reconnection

According to an embodiment, the AP MLD may request link change or reconnection from the non-AP MLD for efficient data transmission. For example, based on data traffic of each AP for load balancing, the AP MLD may request the STA to change or reconnect to a more efficient link.

For example, AP MLD is non-AP MLD based on data traffic load information for each AP and/or channel access capability information between each link (e.g., Simultaneous TX/RX (STR) capability information, etc.) Links suitable for STAs of can be calculated/confirmed/confirmed. Thereafter, the AP MLD may request link change or reconnection to the STA (or non-AP MLD) based on data traffic load information for each AP and/or channel access capability information between each link.

As described above, when requesting a Link change, the AP MLD may transmit Link information it considers most suitable to the non-AP MLD through a request message. For example, the request message may include a Beacon or a management frame.

In relation to the above-described embodiment, an element or field including link information that is considered most suitable may be newly proposed. A newly proposed element or field may be defined as a "recommended link". "Recommended link" is an example, and the name of a specific element or field may be changed.

recommend link (element field): An element or field for the AP MLD to recommend the most suitable Link to the STA of the non-AP MLD based on various information (eg, data load for each Link) for each Link. For example, recommend link (element/field) may be indicated by Link ID information of AP MLD or AP BSS information. In other words, the recommend link (element/field) may include AP MLD Link ID information or AP BSS information.

According to one embodiment, the recommend link (element/field) may be optionally included in a link switching response and transmitted. For example, the STA may establish a connection with the Link recommended by the AP based on the element/field (i.e., recommend Link). For another example, the STA may request a connection to a Link different from the indicated Link based on the element/field (i.e., recommend Link) and additional information possessed by the STA.

A detailed signal exchange process between an AP MLD and a non-AP MLD according to the above-described embodiment may be described with reference to FIG. 15.

Figure 15:
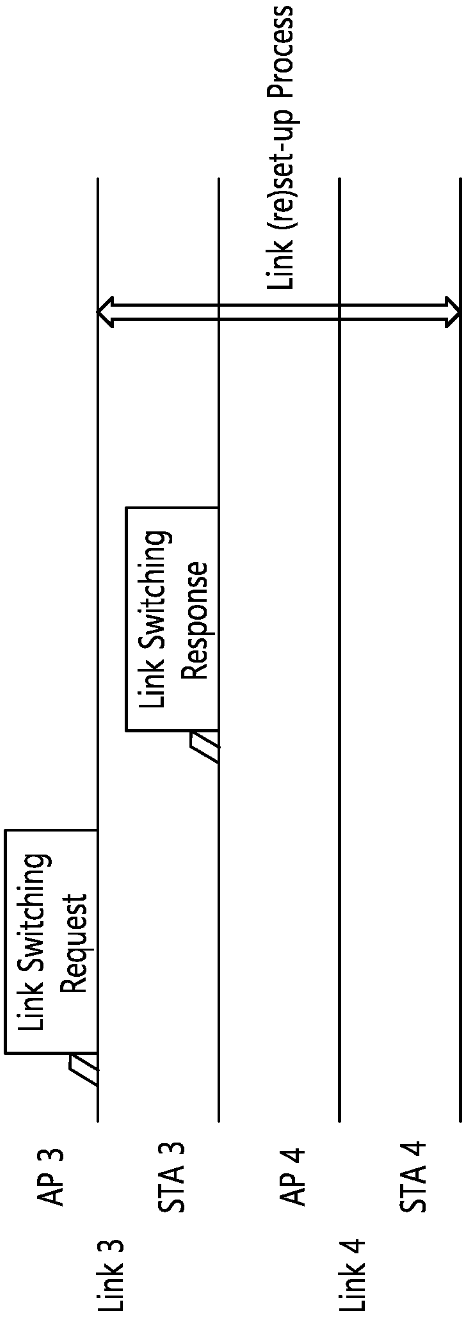
FIG. 15 illustrates operations of an AP MLD and a non-AP MLD for link change or reconnection.

FIG. 15 illustrates operations of an AP MLD and a non-AP MLD for link change or reconnection.

Referring to FIG. 15, in a situation where STA 3 is connected to AP 3 through link 3, a lot of data traffic may flow to AP 3. In other words, in a situation where STA 3 is connected to AP 3 through link 3, a lot of data traffic may be generated in AP 3.

The AP MLD (or AP 3) may request the non-AP MLD (or STA 3) to reconnect to AP 4 having relatively few STA connections. In general, a message for requesting reconnection is transmitted to the STA (i.e., STA 3) that wants to reconnect, but depending on the situation (e.g., channel status or link status), the message may be transmitted to any STA (i.e., other STA). In other words, based on the channel condition or link condition, the STA to which the request message for requesting reconnection (e.g., Link switching request frame) is transmitted may be changed.

For example, when the STA (i.e., STA 3) that has received the request message for requesting reconnection accepts the request, it can send a response message (e.g., Link switching response frame) of "Accept". For another example, the STA (i.e., STA 3) may transmit a "Decline" response message when rejecting the request.

In general, the STA accepting reconnection (i.e., STA 3) sends a response message to the existing link (connection link prior to reconnection), but the response message may be transmitted through any Link (i.e., another STA) using the multi-link characteristic.

If STA 3 accepts the link reconnection request, after transmitting the response message, STA 3 may disconnect from the existing AP 3 and request link reconnection to AP 4. At this time, the reconnection request process may be performed in the same way as the link setup process between existing MLDs. After the link setup process between AP 4 and STA 3 is completed, STA 3 may perform frame exchange with AP 4 through Link 3.

Conversely, when STA 3 rejects the link reconnection request, STA 3 and AP 3 may use the existing connected link (i.e., link 3) as it is.

According to an embodiment, the non-AP MLD may request link change or reconnection to the AP MLD for efficient data transmission. For example, in order to use the STR capability during data transmission, the non-AP MLD may request connection link change or reconnection to the AP MLD.

The non-AP MLD may request link change or reconnection through various methods. Hereinafter, three methods for non-AP MLD to request link change or reconnection may be proposed. Specifically, the above three methods can be sequentially described as a solicited method, an unsolicited method, and a general method.

1) Solicited method: A method in which a non-AP MLD requests various information for Link (re)selection from the AP MLD and receives various information through this. For example, various pieces of information may include information about capabilities, operation elements, and BSS parameters.

According to an embodiment, a method in which an STA requests information of other APs of a connected AP MLD may be used in various cases as well as when a link is reconfigured. For example, after multi-link setup, the STA may request BSS parameter information of other APs for link switching and select the best link based on the received information. Alternatively, in the discovery process, the STA may request BSS load information of each AP from the AP MLD and select a link to perform link setup based on the received information. (However, it is assumed that the number of APs in the AP MLD is greater than the number of STAs in the non-AP MLD.)

Accordingly, the AP receiving the information request message may transmit any information such as capability information, BSS parameter information, critical parameters, and/or operation element information for all APs in the AP MLD. The above-described examples may be applied to all embodiments described below.

2) Unsolicited method: A method in which the AP transmits various information for Link (re)selection without a separate information request from the non-AP MLD. The STA may utilize the received information in various situations. According to an embodiment, a method in which an AP of an AP MLD transmits information of other APs without a request for separate information from an STA may be used in various cases as well as when a link is reconfigured. Accordingly, the AP receiving the information request message may transmit any information such as capability information, BSS parameter information, critical parameters, and/or operation element information for all APs in the AP MLD. The above-described examples may be applied to all embodiments described below.

3) General method: A method in which a non-AP MLD requests Link (re)selection without additional information based on information acquired through previous Beacon frames, etc.

1) Solicited Method

Hereinafter, an embodiment of the solicited method described above may be described first.

According to an embodiment, the non-AP MLD may request information for selecting a suitable link from the AP MLD before link change or reconnection. The STA may utilize data load information for each AP or capability information of each link (or information of other links) in order to select an appropriate link.

For example, the capability information for each link may be included in a beacon frame and transmitted periodically.

For another example, capability information for each link is optional information and may not be included in a beacon frame transmitted every period. Alternatively, in order to reduce frame overhead, only information on a link to which the STA is connected or some links to which the STA is connected may be received. Alternatively, if the beacon reception period is long due to the nature of the non-AP MLD (e.g., low-power device), the non-AP MLD may not be able to receive capability information for each link for more appropriate link selection.

In the above cases, the non-AP MLD may request the latest information of capability information for each link and information for each link of the AP MLD (e.g., BSS parameter information or operation element information, etc.). The link of the capability information for each link and the information for each link may include not only a transmitted/received link but also other links. For example, a QoS data frame field (A-Control field of the 11ax standard), a management frame, a probe response/request frame, a PS-Poll frame, or a null frame may be used to request/transmit the latest information. Alternatively, a separate new frame may be defined to request/transmit the latest information.

According to an embodiment, in order to request capability information for each link and latest information for each link of the AP MLD, the STA may transmit a request message requesting information necessary for link reselection to the AP. For example, a conventionally defined probe request frame for the request message may be reused. For another example, a new frame for the request message may be defined.

According to an embodiment, through the request message, the STA may specify necessary specific information and request it from the AP. Specific information that can be designated may be changed according to circumstances. That is, the STA may request only information corresponding to a specific link or information corresponding to a specific capability. For example, information corresponding to a specific link may include information about BSS load/parameters of the specific link. Also, information corresponding to capability may include BSS load information of all links (all links) or BSS load information of a specific link. In this case, the AP may transmit only information designated by the STA through a response message. A specific embodiment of a specific information request and response may be described through an embodiment of an IOM definition and operation.

As another example, the STA may request all capability information currently possessed by the AP MLD (e.g., including information on other links) through the request message.

As in the above example, an embodiment for transmitting all information possessed by an AP or an embodiment for transmitting only specific information designated by an STA may be defined/configured in various ways. For example, the AP may transmit all information or designated information based on a separate field or bitmap to indicate (or transmit) only specific information.

In general, a message requesting information from the AP MLD may be transmitted through an STA that wants reconnection, but may be transmitted to any STA (i.e., other STA) depending on circumstances (channel condition or link condition).

The AP MLD receiving the request message sends a response message (i.e., information message) including information requested by the STA (e.g., data load information for each link, STR capability information between links, etc.) to the non-AP MLD. For example, when a probe request frame of a conventional standard is reused for the request message, the AP (or AP MLD) must respond using a probe response frame as the response message.

The response message may also be generally transmitted through the AP that has received the request message, but may be transmitted to any AP (i.e., other AP) using multi-link characteristics.

Optionally, the AP MLD may transmit a "recommend link" element recommending a suitable link to the STA through a response message including various pieces of information (e.g., latest information necessary for link reselection).

The solicited method described above may be used for link change or reconnection in an STA of a non-AP MLD. For example, when an STA of a non-AP MLD wants Link reselection due to link congestion, the STA of the non-AP MLD can request BSS load information and BSS parameter information for each link of the connected AP MLD through a solicited method. Upon receiving this request message, the AP may transmit the link and information indicated by the STA in a response message.

Hereinafter, the above-described request message and response message may be described as an information request message and an information response message in order to be distinguished from a request message for link change and a response message for link change.

Based on the information included in the above information response message, the STA may reselect an appropriate link and request link change or reconnection to the AP MLD through a link change request message. The request message for link change may include AP information and Link information to be reconnected to.

Upon receiving the request message, the AP MLD may transmit a response message of "Accept" when accepting the request. When the AP MLD rejects the request, it may transmit a response message of "Decline".

If the request is accepted, the AP may perform Link (re)setup based on frame exchange through the Link of the reselected AP after transmitting the response message. Conversely, when rejecting the request, the STA can use the existing connected Link as it is.

An example of specific AP MLD and non-AP MLD operations according to the solicited method may be described with reference to FIG. 16.

Figure 16:
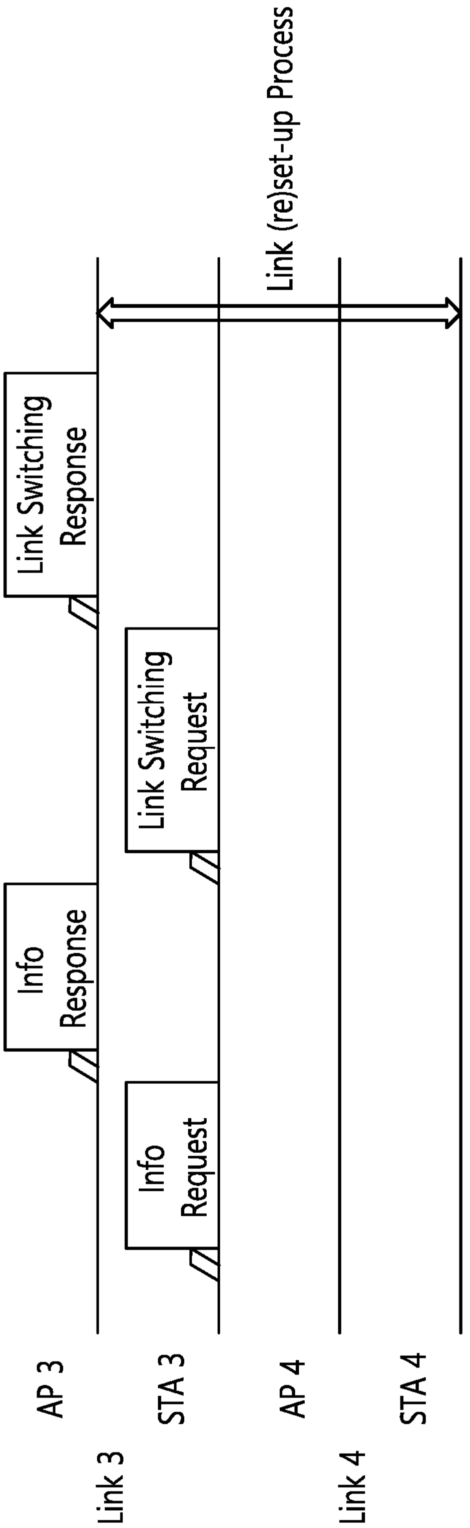
FIG. 16 illustrates operations of an AP MLD and a non-AP MLD for link change or reconnection.

FIG. 16 illustrates operations of an AP MLD and a non-AP MLD for link change or reconnection.

Referring to FIG. 16, when STA 3 of a non-AP MLD wants to reselect a connected Link, STA 3 may transmit an Info request message to AP MLD through Link 3. Upon receiving this, the AP MLD may transmit an Info response message including information necessary for link reselection of the non-AP MLD. Based on the information included in the above-described Info response message, STA 3 of the non-AP MLD may transmit a link change request message (i.e., link switching request frame) to AP 3 of the AP MLD. Thereafter, STA 3 may receive a response message for link change (i.e., link switching request frame) and perform link (re)set-up for link change.

An embodiment of an information request proposed in this specification may be used/applied even when an STA requests necessary information from an AP. When information included in a frame (e.g., beacon) received by the STA from the AP is insufficient, the STA may request the AP for the insufficient information. For example, when the AP transmits only information on a connected link without including information on the other link or transmits only information on whether or not information on the other link is updated, the STA may request the AP for insufficient information.

Hereinafter, a new element/field including information for an STA of a non-AP MLD to select an appropriate link may be proposed.

For example, "STA ratio per Link" (element/field) may be suggested. "STA ratio per Link" may include information about the ratio of the number of STAs connected to each link. A specific example of "STA ratio per Link" may be described through FIG. 17.

Figure 17:
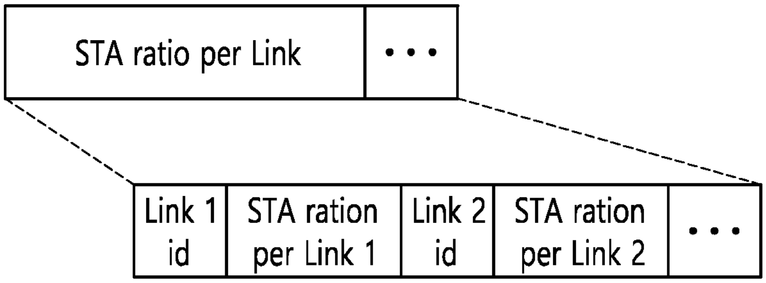
FIG. 17 shows a specific example of STA ratio per Link.

FIG. 17 shows a specific example of STA ratio per Link.

Referring to FIG. 17, STA ratio per Link (element/field) may include information about the number or ratio of STAs connected to each link in the entire AP MLD.

For example, if a total of 50 STAs are connected to an AP MLD having 3 Links, 10 STAs may be connected to Link 1 and 20 STAs may be connected to Link 2. The AP MLD may transmit information about the value or ratio (%) of information about STAs connected to each link to the non-AP MLD through STA ratio per Link (element/field).

For example, when information about an STA connected to each Link is expressed as a value, Link 1 may be expressed/set as 10 and Link 2 as 20. Accordingly, the value of STA ratio per link 1 may be set to 10. In addition, the value of STA ratio per link 2 may be set to 20.

As another example, when information on STAs connected to each link is expressed as a ratio, Link 1 may be expressed/set as 20 (10/50)% and Link 2 as 40 (20/50)%. Accordingly, the value of STA ratio per link 1 may be set to 20. In addition, the value of STA ratio per link 2 may be set to 40.

The above example is illustrative, and information on STAs connected to each link can be set in various ways. In addition to the above examples, information on STAs connected to each link may be set as a relative value.

Based on the information on the STAs connected to each link described above, the STA can check/acquire the number and ratio of STAs connected to each link, and use this as information for link selection.

According to one embodiment, in addition to the above-described "STA ratio per Link" (element/field), various information/element/fields may be included in the information response message. For example, the following information/element/field may be included in the information response message.

- BSS load information for each AP
- STR Capability information between Links
- TXOP information for each link
- NAV information for each link
- Recommended Link information (i.e. "recommend Link" element)
- Link-specific STA ratio information (i.e., "STA ratio per Link" element)
- Etc.

In addition to the above information/element/field, various information necessary for link selection may be included in the information response message and transmitted.

Upon receiving information such as the above example, the STA may select an AP to be changed or reconnected to based on the received information, and then transmit a request message for requesting link reconnection. Upon receiving the request message, the AP MLD may transmit a response message of "Accept" when accepting the request. When the AP MLD rejects the request, it may transmit a response message of "Decline".

If the request is accepted, the AP can perform frame exchange through the link with the reselected AP after sending the response message. Conversely, in case of rejection, the STA can use the existing linked Link as it is.

2) Unsolicited Method

Unlike the solicited method in which the non-AP MLD directly requests additional information, according to the unsolicited method, a beacon frame or a separate frame (e.g., a field of the QoS data frame (11ax standard A-Control field), management frame, FILS discovery frame, unsolicited probe response frame, PS-Poll frame or Null frame, etc.), the AP MLD may transmit additional information to the non-AP MLD. For another example, a new frame may be defined as a frame for transmitting additional information to a non-AP MLD.

For example, if the beacon period is rather long, essential information required for link switching in the non-AP MLD may be insufficient or may not be the latest information. Accordingly, the AP may transmit a frame including link capability information of the AP MLD to the non-AP MLD. After that, the non-AP STA may obtain the latest information on the capability of each link of the AP MLD. The frame may be transmitted periodically or aperiodically.

For example, when the frame is transmitted periodically, the AP may transmit the frame to share the latest information of the AP at regular time intervals. At this time, the time interval should be shorter than the beacon period transmitted by the AP. In addition, when a FILS discovery frame is used as the frame, the frame may be transmitted every 20 us. As another example, a period agreed between the AP and the STA through capability negotiation may be used. For example, the transmission period may be indicated through the "periodic" field and the "interval" field/subfield value of the IOM capability element.

As another example, when the frame is transmitted aperiodically, the AP may transmit the frame whenever an update event occurs in information (capability, BSS parameter, operation element) of the AP. As a specific example, whenever the link capability of the AP of the AP MLD is changed, changed information may be transmitted to the connected STA. In this case, the STA may maintain up-to-date information on link capability.

According to the above-described example, since the non-AP STA does not transmit a request message for acquiring a separate link capability, there is an effect of relatively less frame exchange overhead than the solicited method. In addition, since the STA can receive the updated information whenever the main information is updated, there is an effect that the STA can use the received information usefully.

An example of specific AP MLD and non-AP MLD operations according to the unsolicited method can be described with reference to FIG. 18.

Figure 18:
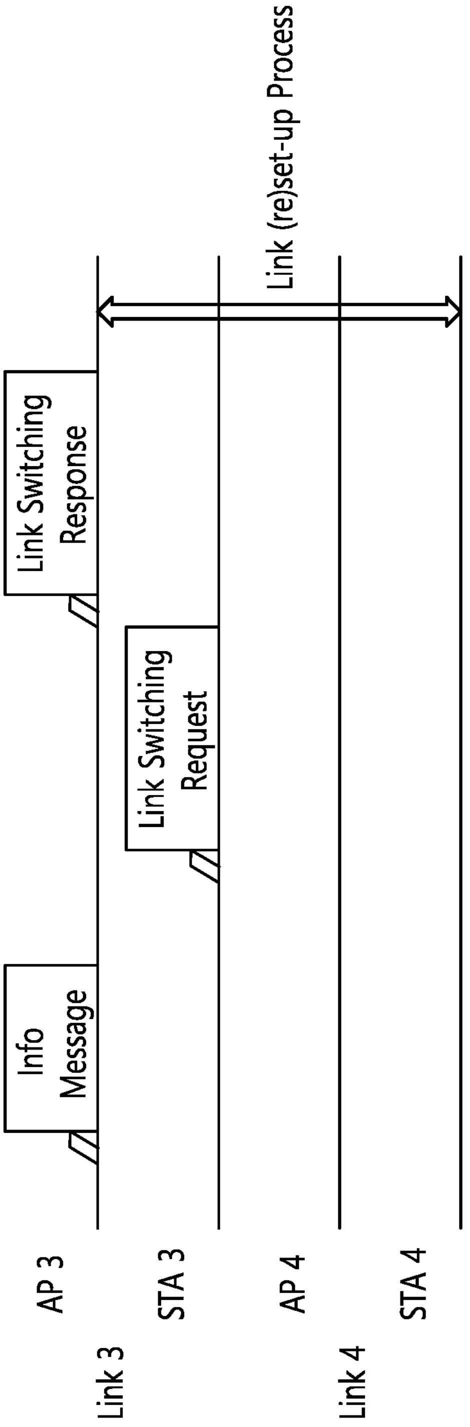
FIG. 18 illustrates operations of an AP MLD and a non-AP MLD for link change or reconnection.

FIG. 18 illustrates operations of an AP MLD and a non-AP MLD for link change or reconnection.

Referring to FIG. 18, the AP MLD may transmit essential information required for Link reselection in a separate frame (e.g., PS-Poll frame or Null frame) without a separate request message from the non-AP MLD to the non-AP.

Upon receiving this, the non-AP MLD can obtain the latest link capability information regardless of the beacon frame period, and based on this, can select an appropriate link during link switching. Based on this information, the STA reselects an appropriate link and requests link change or reconnection to the AP MLD. This request message includes AP information and Link information to be reconnected to. In addition, the AP MLD receiving this message sends a response message of "Accept" when accepting the request, and a response message of "Decline" when rejecting the request. If the request is accepted, the AP performs Link (re)setup through frame exchange with the Link of the reselected AP after sending the response message. Conversely, if rejected, the STA uses the existing linked Link as it is.

3) General Method

According to the general method, a non-AP MLD can request link change or reconnection without requesting additional information based on its current information. The information used at this time can include AP MLD information and non-AP MLD information (e.g., STR capability information for each link, Link state (enable/disable) information, etc.) included in the previously received Beacon or Management frame.

Unlike the solicited method, the STA may directly transmit a link change or reconnection request message to the AP MLD without requesting separate information from the AP MLD. The request message may include AP information to be reconnected with and Link information. Upon receiving the request message, the AP MLD may transmit a response message of "Accept" when accepting the request, and a response message of "Decline" when rejecting the request.

If the request is accepted, the AP can perform frame exchange through the link with the reselected AP after sending the response message. Conversely, in case of rejection, the STA can use the existing linked Link as it is.

An example of specific AP MLD and non-AP MLD operations according to the general method may be described with reference to FIG. 19.

Figure 19:
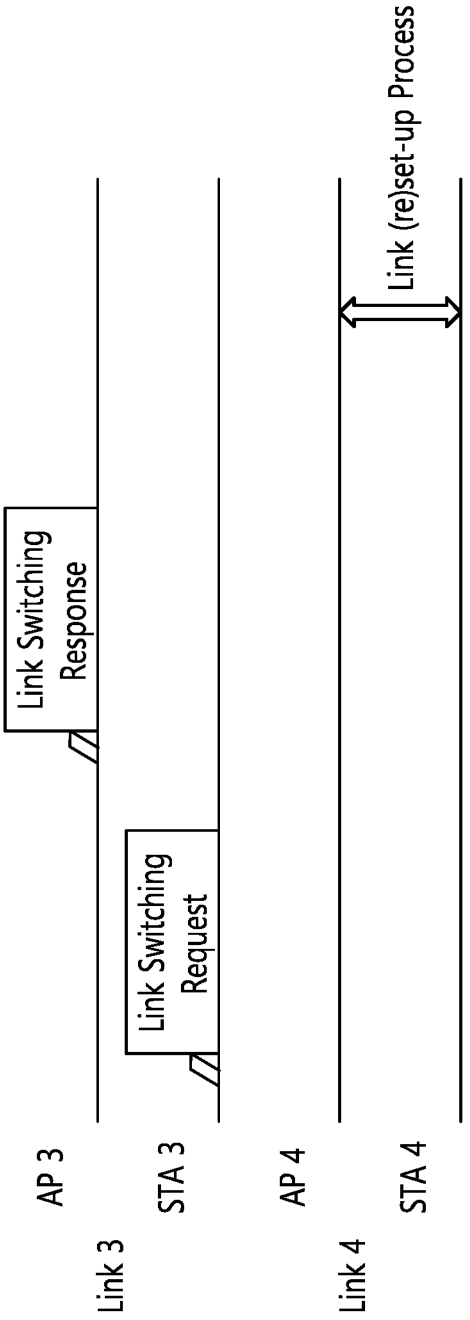
FIG. 19 illustrates operations of an AP MLD and a non-AP MLD for link change or reconnection.

FIG. 19 illustrates operations of an AP MLD and a non-AP MLD for link change or reconnection.

Referring to FIG. 19, STA 3 may want to directly change Link for reasons of QoS guarantee. If STA 3 already has information received from the AP MLD (for example, information received through a Beacon frame or Management frame, etc.) or has already determined the Link it wants to reconnect, STA 3 may request link change or reconnection without a separate information request.

STA 3 may transmit STA information (e.g. STA ID, etc.) and Link information to be changed (e.g. Link ID or AP BSS information, etc.) in the Link switching request frame. Upon receiving this, the AP MLD may transmit a Link switching response frame of "acknowledgment" to STA 3 through the existing Link 3 when accepting the change. Thereafter, STA 3 of the non-AP MLD may reconnect to AP 4 after performing a Link (re) setup process.

Embodiments for Anchored Link Change and Reconnection

According to one embodiment, the AP MLD may support Anchored Link. When the AP MLD supports an anchored link, there are additional considerations in the above-described embodiment for link change and reconnection.

The AP MLD may support one or more anchored links, and may provide information about one or more anchored links to the non-AP MLD through anchored link list information/element. Non-AP MLD can select and use one or more links from the Anchored Link List as its own anchored link. Other links other than the one selected as an anchored link can operate as non-anchored links.

Anchored Link and non-Anchored Link have a trade-off relationship in terms of power consumption and data load. That is, if the non-AP MLD uses one anchored link, power consumption can be reduced, but it may be difficult to guarantee data (in particular, data for beacon and management frame) transmission QoS. Conversely, if multiple anchored links are used, data transmission QoS is guaranteed, but the amount of power reduction may be reduced.

Therefore, the non-AP MLD must be able to dynamically request reselection for an anchored link for efficient data exchange. Therefore, in the following, an embodiment for a non-AP MLD to dynamically request an anchored link change/reselection may be proposed.

First, an MLD structure supporting Anchored Link can be described with reference to FIG. 20.

Figure 20:
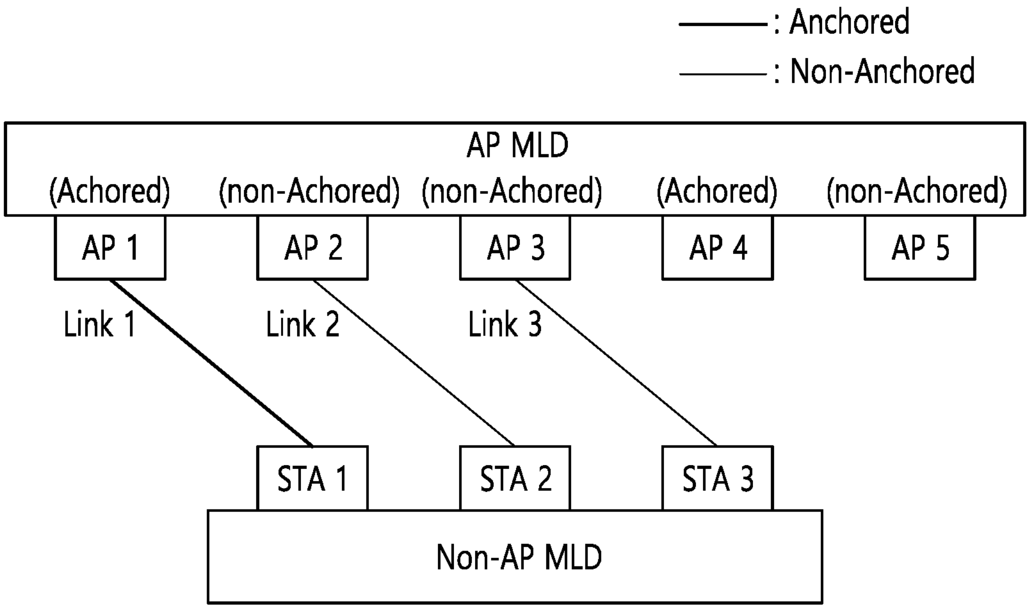
FIG. 20 shows an example of an MLD structure supporting Anchored Link.

FIG. 20 shows an example of an MLD structure supporting Anchored Link.

Referring to FIG. 20, the AP MLD may use two links (i.e., AP 1 and AP 4) among the five links as anchored links. The non-AP MLD can use one anchored link by selecting link 1 from two links used as anchored links. The remaining Links of the Non-AP MLD may be connected to non-Anchored Links (Link 2, Link 3). That is, the non-AP MLD must always monitor Link 1 for reception of Beacon and management frame.

According to an embodiment, STA 1 may request to change the previously used anchored link to an anchored link of AP 4 instead of AP 1 for reasons such as load balancing. The above-described embodiment of link switching may be applied to change the anchored link.

However, anchored links are limitedly supported by some of the links supported by AP MLD. Accordingly, the AP MLD may have a separate Anchored Link List. The non-AP MLD (or STA) must select one of the links included in the Anchored Link List and request change or reconnection. In addition, since the non-AP MLD must have at least one anchored link, it is necessary to request an anchored link change considering this when requesting a link change or reconnection.

For the above-described embodiment, the AP MLD must additionally provide "Anchored Link List" information to the non-AP MLD. This may be included in the frame in the form of a new element or field. The above-described name of "Anchored Link List" is exemplary and may be set/expressed in various ways.

"Anchored Link List" (element/field): Anchored Link list information supported by the current AP MLD. For example, list information of anchored links supported by the current AP MLD may be indicated/configured as one or more Link IDs or AP BSS values. Non-AP MLD must be connected to at least one anchored link among the links included in the list.

The above information (for example, "Link List" (element/field)) is included in the existing Beacon or management frame and transmitted, or in the case of the Solicited method described above, it may be included in the Info response message and transmitted to the non-AP MLD.

Therefore, when the non-AP MLD requests to change the Anchored Link it uses, the non-AP MLD must know in advance the Anchored Link List information currently supported. If the non-AP MLD does not know the Anchored Link List information or wants to obtain the most up-to-date information, it can be obtained from the AP MLD in a solicited method.

Based on the Anchored Link List information, the STA may request change or reconnection to only one link in the Anchored Link List. If a change or reconnection is requested to another link not included in the list, the AP MLD may transmit a rejection message to the STA.

When changing or reconnecting an anchored link, there are additional considerations in addition to the existing link change method. Cases in which the STA of the non-AP MLD changes the anchored link can be largely classified into two types.

The first is when an STA already connected through an anchored link changes to another anchored link in the AP MLD for reasons such as load balancing (changing an AP for an anchored link). Second, when an STA connected through an anchored link is disabled due to a power state or the like, another STA in a non-AP MLD is reconnected to an anchored link (STA change for anchored link).

The first case may operate similarly/identically to the above-described embodiment for link change and reconnection. However, when the STA reselects the Link, it must select from among the Links in the Anchored Link List supported by the AP MLD. If another link is selected, the AP MLD may transmit a rejection response message.

The second case requires additional consideration. An example for the second case can be described through FIG. 21.

Figure 21:
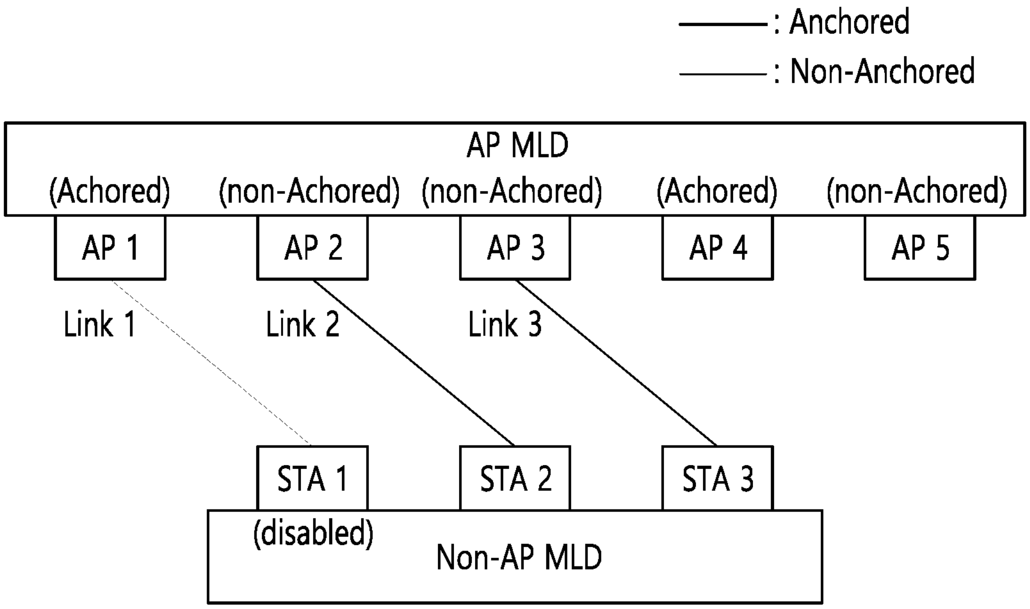
FIG. 21 illustrates an example of a situation in which anchored link change or reconnection is required.

FIG. 21 illustrates an example of a situation in which anchored link change or reconnection is required.

Referring to FIG. 21, the state of STA 1 of an STA of anon-AP MLD may be disabled for various reasons (e.g., power off, etc.). At this time, since both STA2 and STA 3 are currently connected to the non-anchored link, one of the STAs must be reconnected to the anchored link.

As shown in FIG. 21, when the non-AP MLD needs to reconnect the Anchored Link, the non-AP MLD may attempt to reconnect one STA of STA 2 and STA 3 to the Anchored Link.

For example, if the non-AP MLD knows information about the Anchored Link List supported by the AP MLD, the non-AP MLD can select an appropriate link and request a link change.

For another example, if the non-AP MLD does not have information about the Anchored Link List supported by the AP MLD, After acquiring information from the AP MLD through an Info request, the non-AP MLD can request a link change by selecting an appropriate link.

An example of specific operations of the AP MLD and non-AP MLD according to the above-described embodiment may be described with reference to FIG. 22.

Figure 22:
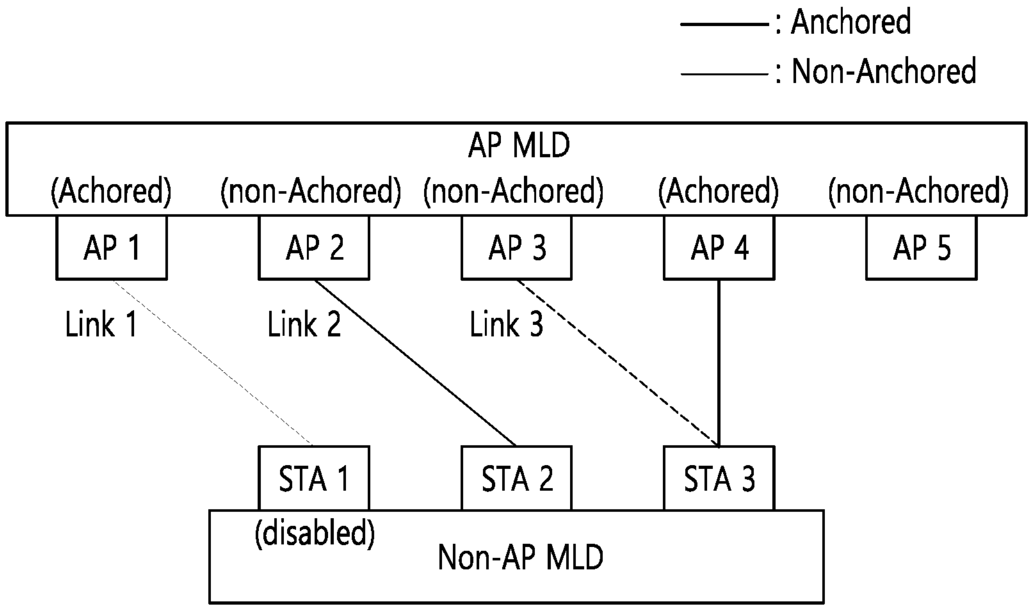
FIG. 22 illustrates operations of an AP MLD and a non-AP MLD for anchored link change or reconnection.

FIG. 22 illustrates operations of an AP MLD and a non-AP MLD for anchored link change or reconnection.

Referring to FIG. 22, when STA 1 connected to the anchored link is disabled, the non-AP MLD requires a new anchored link connection. At this time, the non-AP MLD may disconnect the non-anchored link with the AP 3 that was previously connected to the STA 3 and attempt reconnection through the anchored link.

For example, STA 3 may attempt to connect to AP 1 used as an existing anchored link. For another example, STA 3 may attempt to connect to a new AP 4 based on various pieces of information.

A process of selecting a new anchored link may be performed in the same or similar manner to the above-described embodiment for link change or reconnection. For example, STA 3 may request reconnection by selecting an anchored link recommended by the AP or by directly selecting an anchored link by STA 3. After completing the anchored link reconnection, the link of STA 3 may operate as an anchored link.

Element/Field Containing Information about an Anchored Link

According to an embodiment, when information on an anchored link supported by an AP MLD is changed or when an STA directly requests information on an anchored link, the AP MLD sends the information to the non-AP MLD (i.e., information on the changed anchored link) Alternatively, information about an anchored link requested from the STA) may be transmitted.

For example, the above information may be included in a beacon frame and transmitted as information related to an anchored link currently in use, or may be included in a separate management frame and transmitted.

The anchored link information may include an “Anchored Link List” element indicating anchored links supported by the above-described AP MLD and information on whether an anchored link is used for each STA of the non-AP MLD.

Hereinafter, new elements including information on the above-described anchored link may be proposed. Newly proposed elements can be configured/configured as follows.

1) “Anchored Link Indication” element (or field): The “Link Indication” element may include information on whether or not Anchored Link is used for each STA connected to the AP MLD. That is, the “Anchored Link Indication” element may be an element/field indicating whether an anchored link is used for each link or STA of non-AP MLD.

2) “STA ratio per Anchored Link” element (or field): The “ratio per Anchored Link” element may include information about the ratio or number of STAs connected to each anchored link. However, only STAs using Link as an Anchored Link may be considered. In other words, even if the AP MLD supports the first link as an anchored link, an STA using the first link as a non-anchored link may not be included in the STAs connected to each anchored link.

According to an embodiment, the elements may be included as additional information in a frame, if necessary, in all processes of the above-described embodiment for changing or reconnecting the anchored link.

Figure 23:
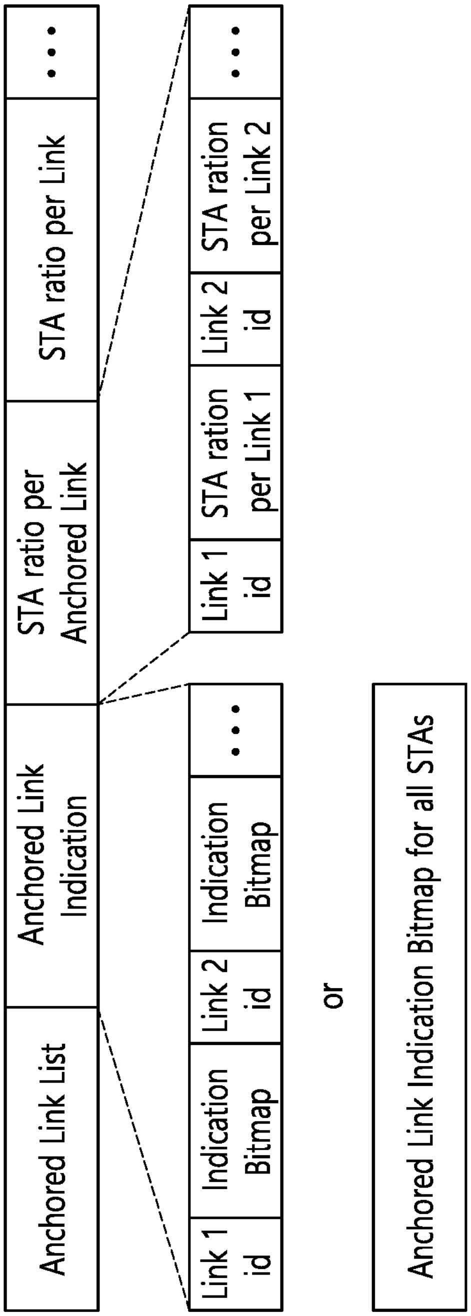
FIG. 23 illustrates a specific example of an element for reconnection of an anchored link.

A specific example of the elements may be described through FIG. 23.

FIG. 23 illustrates a specific example of an element for reconnection of an anchored link.

Referring to FIG. 23, information about an anchored link may be transmitted through an Anchored Link List element (or field), an Anchored Link Indication element (or field), and/or an STA ratio per Anchored Link element (or field). In other words, the element for Anchored Link reconnection may include an Anchored Link List element (or field), an Anchored Link Indication element (or field), and/or an STA ratio per Anchored Link element (or field).

According to an embodiment, the Anchored Link List element may include link list information supported by the current AP MLD as described above. For example, Link list information supported by the current AP MLD may be indicated based on Link ID or AP BSS information. In other words, the Link list supported by the current AP MLD may be configured/configured based on Link ID or AP BSS information.

According to an embodiment, the Anchored Link Indication element may include information about whether an anchored link is used for each STA of a non-AP MLD. For example, information on whether an anchored link is used for each STA of a non-AP MLD may be indicated/displayed through an indication bitmap for each link. For another example, whether an anchored link is used for all STAs may be indicated/indicated through one bitmap.

For example, when information on whether an anchored link is used is indicated by an indication bitmap according to a link ID, the STA can check the current anchored link based on the value of the anchored link list element. Therefore, the STA can check the ratio of STAs connected to each anchored link. In this case, the indication bitmap field for the non-anchored link may be omitted to reduce overhead.

When the value of one bit in the bitmap is 1, the one bit may mean that a link currently connected to the STA is an anchored link. When the value of one bit in the bitmap is 0, the one bit may mean that a link currently connected to the STA is a non-anchored link. An embodiment in which a bitmap is used to indicate whether each STA has an anchored link connection is an example, and information about whether each STA has an anchored link connection can be transmitted through various embodiments.

According to an embodiment, the ratio of STAs for all links supported by the AP MLD may be transmitted. According to an embodiment, the STA ratio per Anchored Link element may include information about a usage ratio or number of actual anchored links of STAs for each anchored link. For example, since the information is displayed only for the anchored links indicated/displayed in the Anchored Link List element, overhead can be reduced.

An example in which the value of the STA ratio per Anchored Link element is set can be described below.

For example, an AP MLD may include 5 APs (i.e., AP 1 to AP 5), and AP 1 may be connected to STAs through link 1. AP 2 may be connected to STAs through link 2. AP 3 may be connected to STAs through link 3. AP 4 may be connected to STAs through link 4. AP 5 may be connected to STAs through link 5.

The AP MLD may support two links among five links (i.e., link 1 to link 5) as anchored links. Link 1 and link 4 can be supported/used as anchored links.

A total of 10 STAs are connected to Link 1 (or AP 1), and there may be 7 STAs using link 1 as an anchored link. If this is expressed as a ratio, it can be expressed/displayed as 70%, and if it is expressed as a value, it can be expressed/displayed as 7.

A total of 20 STAs are connected to Link 4 (or AP 4), and there may be 5 STAs using link 4 as an anchored link. If this is expressed as a ratio, it can be expressed/displayed as 25%, and if it is expressed as a value, it can be expressed/displayed as 5.

The STA ratio per Anchored Link element is transmitted together with the above-described STA ratio per Link element information, so that more accurate information can be transmitted to the STA. In general, since an anchored link can have relatively more data traffic than a non-anchored link, the STA ratio per anchored link element can be used as useful information for an STA reselecting an anchored link.

Based on the above information (or elements), the non-AP MLD can check whether the link to which it is connected is an anchored link, the connection ratio of STAs for each anchored link, and the ratio of actual anchored link use.

In addition, when the AP MLD transmits information on other links, that is, all links, through the above elements, the STA can check the connection ratio and actual usage ratio for each STA for all anchored links of the AP MLD based on one frame. Accordingly, the above information (or elements) can be utilized when the STA reselects the anchored link to be used.

Therefore, according to an embodiment for changing or reselecting Anchored Link, by using information on the above-described anchored link (For example, anchored link list information, anchored link usage indication information for each STA, or actual STA usage ratio information for each anchored link, etc.) as well as various link information used in the embodiment for link change or reselection (For example, BSS load information for each AP or STR capability information for each link, etc.), more suitable anchored link change or reconnection can be performed.

Link Re-Setup Process After Link Switching

In this specification, we propose a link re-setup process after the link switching request-response process mentioned above. Based on various information during link switching, the non-AP STA selects an appropriate link, sends and receives a request message for the link switching with the AP MLD, and if the AP MLD accepts it, the non-AP STA selects the link requested for change and AP MLD go through the Link (re) setup process. This is also shown in FIG. 19.

In this specification, two methods are proposed for the link (re) setup process after link switching: an explicit link re-setup method and an implicit link re-setup method. However, when the STA of the non-AP MLD performs link re-setup after link switching, there may be two cases for some attributes (state, agreements, allocations) after link switching.

The first is to reset or delete some properties to the initial value, and the second is to maintain the current value without being reset or deleted to the initial value.

In the first case, when the STA performs reassociation according to the existing standard, some attributes are reset to initial values or deleted according to the AP. If the link re-setup mentioned in this specification follows the existing standard, initial value reset or deletion of links can be performed not only for the link for which link re-setup is performed, but also for other links of the same non-AP MLD. can Since it follows the existing standard, it can be backward compatible.

The second is to maintain existing property values without resetting or deleting some properties of other links except for links that perform Link re-setup for some properties. Attribute value changes according to link change can be updated only for links that perform link conversion, and attributes for existing links must maintain their original values. This method can prevent additional frame exchange by maintaining existing attribute values even after link change, and can reduce the effect of other link switch.

The method mentioned above is a method that can be applied to both a link re-setup process using an existing (re)association frame and a link re-setup process using a new frame.

Explicit Link Re-Setup Method

The explicit link re-setup method means a process performed through exchange of a separate message (e.g., (re) association request/response, etc.) for link re-setup after exchanging link switching messages. This process includes frame exchange for link reconfiguration after the non-AP STA accepts the link switching request to the AP MLD as shown in FIG. 19. An example of this is shown in FIG. 24.

Figure 24:
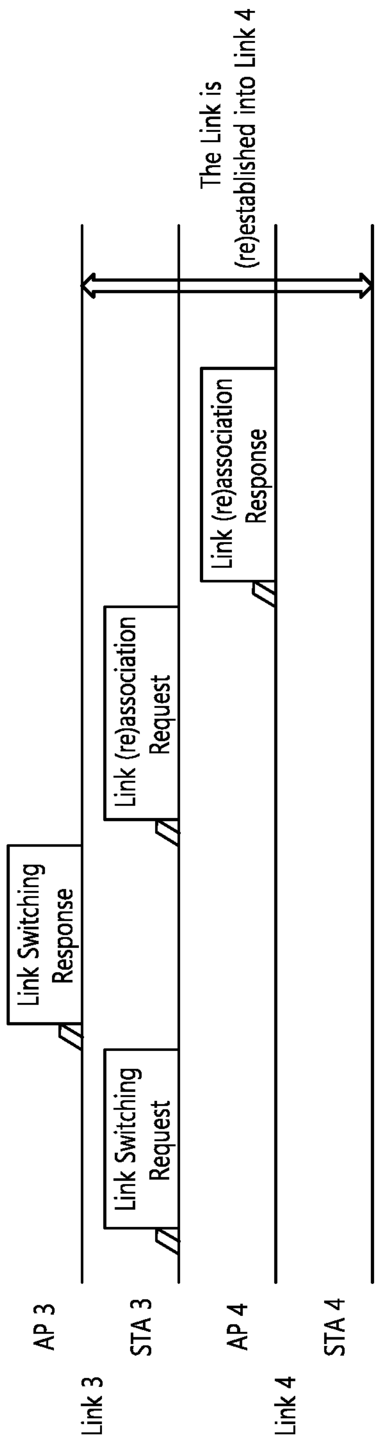
FIG. 24 shows an example of an Explicit Link re-setup process.

FIG. 24 shows an example of an Explicit Link re-setup process.

Referring to FIG. 24, after STA 3 sends a message requesting a change to Link 4 to the AP MLD, if the AP MLD accepts it, it transmits a Link switching response message including an acceptance message. After that, in the non-AP MLD, STA 3 resets the Link in the same way as before through a separate (re)association frame exchange with AP 4. Thereafter, STA 3 is connected to AP 4 and operates based on Link 4.

Figure 25:
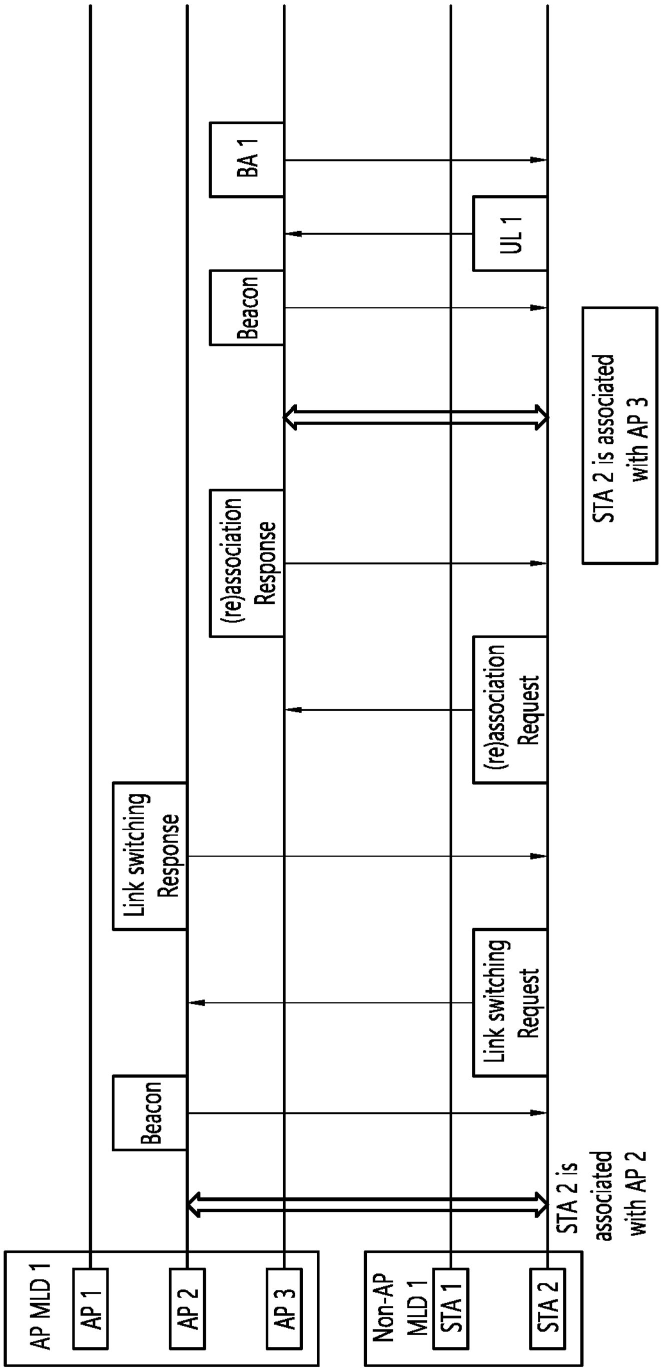
FIG. 25 shows an example of a link re-setup process using a (re)association frame.

FIG. 25 shows an example of a link re-setup process using a (re)association frame.

FIG. 25 is an example of performing link re-setup after link switching of an STA using an existing (re)association frame. In this case, since MLD common information that does not need to be exchanged when MLD links are changed can also be exchanged as an attribute of a (re)association frame, duplicate information can be exchanged.

In addition, in the explicit link re-setup method, anew frame may be used for a separate message for link re-setup after exchanging link switching messages. An embodiment for this is shown in FIG. 26.

Figure 26:
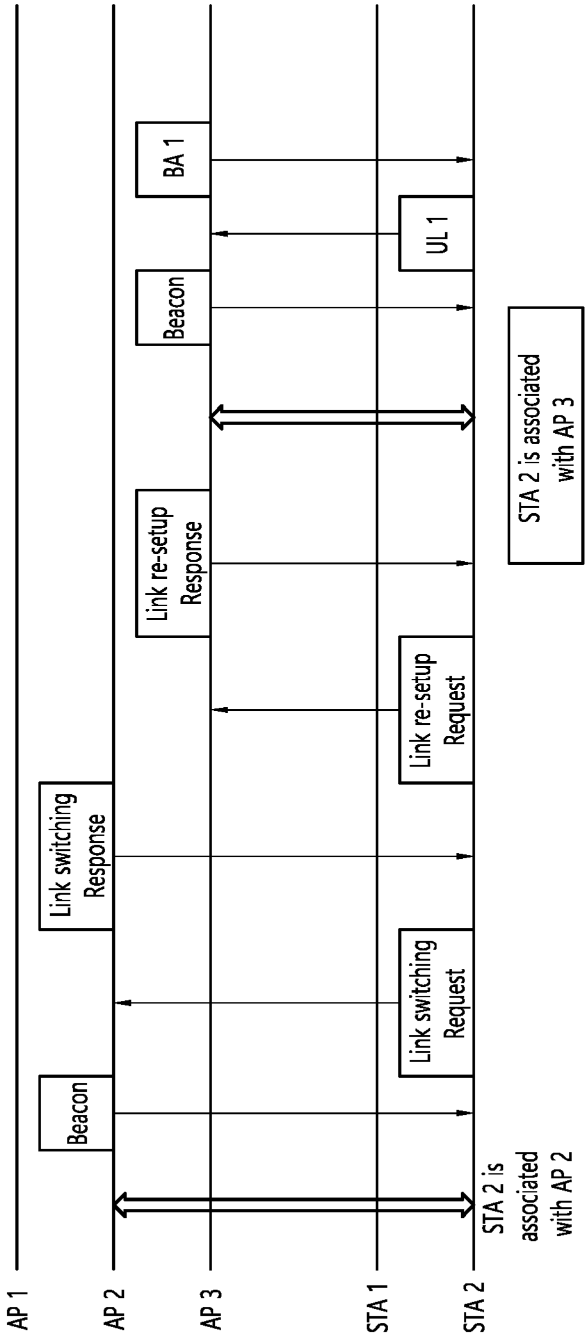
FIG. 26 shows an example of a link re-setup process using a new frame.

FIG. 26 shows an example of a link re-setup process using a new frame.

The new frame of FIG. 26 is a frame containing only essential information required when a non-AP STA changes its link to another AP of a connected AP MLD. At this time, the essential information is the information that the STA and the AP must exchange for link re-setup (e.g. attributes in the existing reassociation frame), which are already exchanged between the AP MLD and the non-AP MLD during initial multi-link setup, It means essential information excluding redundant information that does not need to be exchanged or unnecessary information that does not need to be exchanged again because it is common information that has a common value among MLDs. For example, this information may be time synchronization information (e.g. timing offset, TSF timer accuracy, time stamp, etc.) or TWT information of an AP to be linked switched.

If a new frame for separate link re-setup is defined in this way, if the STA needs to re-establish a link with another AP even in a USE case other than when the STA performs link switching, link re-setup may be performed with minimal information exchange.

Implicit Link Re-Setup Method

Unlike the previously proposed explicit link re-setup, the implicit link re-setup method performs a link reconfiguration process without a separate message.

To this end, the AP MLD may include and transmit minimum essential information for Link (re)setup in the Link switching response. Required information for link (re)setup can be defined as follows, but it has not yet been finalized and can be added as needed.

AID (Association ID): AID information to be used in the change link:

1) In the case of an AID value, the non-AP STA may use the existing AID value as it is or may receive new AID information from the AP. If AP MLD uses Single AID, this information may be omitted.

2) When a new AID is allocated, a new AID value is included, and when an existing AID is used, information indicating that the existing AID is used the same may be displayed in a separate field or the non-AP STA may be notified by omitting the AID information. A method of indicating this may be additionally defined. If the existing AID is reused, the existing frame overhead can be reduced by omitting the AID field or using only the minimum bit.

Channel information: channel information to be used in the change link

Sync Information: Information to be used for synchronization in the changed link (Beacon reception start time, Beacon interval, etc.)

TID mapping information: TID mapping information to be applied to the changed link:

1) When changing links, all TIDs can be applied as default values, TID mapping information used in existing links can be used as is, or new TID mapping information can be applied according to the status of each link in AP MLD.

Etc.

At this time, the essential information is the information that the STA and the AP must exchange for link re-setup (e.g. attributes in the existing reassociation frame), and the AP MLD and non-AP MLD are already exchanged during initial multi-link setup, and need to be re-exchanged. It means essential information excluding unnecessary information that does not need to be exchanged because it is redundant information that does not exist or common information that has a common value among MLDs. For example, this information may be time synchronization information (e.g. timing offset, TSF timer accuracy, time stamp, etc.) or TWT information of an AP to be linked switched.

The Link (re)setup essential information mentioned above is determined based on the information shared from the AP connected to the Link to be changed requested by the STA. In other words, it is a value set considering the information of the AP connected to the link where the AP MLD is to be changed.

Figure 27:
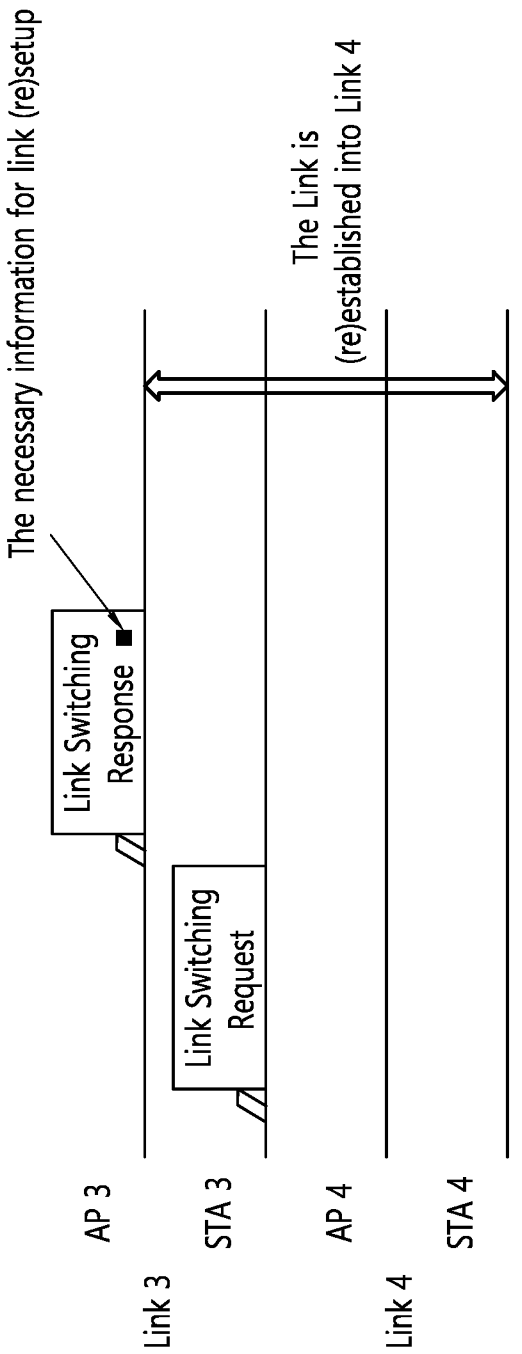
FIG. 27 shows an example of an Implicit Link (re)setup process.

FIG. 27 shows an example of an Implicit Link (re)setup process.

For example, as shown in FIG. 27, AP 3 includes essential information for reconfiguration by STA 3 to AP 4 in a Link switching response message accepting Link switching and transmits the message. STA 3 receiving this information can operate while connected to Link 4 without exchanging additional frames for separate negotiation.

This process can reduce frame exchange overhead compared to the Explicit Link re-setup process.

However, in the case of the implicit link re-setup process, it is assumed that the non-AP MLD and the AP MLD know all capability information of each other before exchanging messages for link switching.

In the case of the proposed method, since there is no separate explicit message exchange for negotiation between the non-AP MLD and the AP MLD in the process of reconfiguring to a new link, information on basic capabilities for each other must be obtained before the link switching request/response process. It is possible to determine the appropriate link (re)setup essential information to include in the link switching response message without a separate explicit message, and even after that, reconnection to the changed link is possible without additional information.

To this end, the solicited method previously proposed in this specification may be used.

If the non-AP MLD and AP MLD lack capability information for each other, link change is possible without a separate message through the implicit link (re)setup process after receiving sufficient information through the solicited method.

In other words, if the non-AP MLD and the AP MLD have enough information about each other, the implicit link (re)Setup operation proposed in this specification can be used.

In detail, the frame for link switching will be determined later, and information indicated for link switching may be different according to definitions in later standards. If a new frame is defined for link switching, the link of the STA may be changed to another AP of the connected AP MLD using Link Identifier information or TID mapping information. For example, when an STA wants to change a link to another AP of the same connected AP MLD, the link identifier information it wants to change (e.g. Link identifier or BSSID or STA ID and channel level of the corresponding BSS, etc.) TID mapping information can be transmitted to the AP MLD, and when the AP MLD responds with a link switching response with an acceptance message based on the information, the STA can change its link to a new AP. Also, the changed link is established based on the TID mapping information included in the request message. In this way, in order to omit a separate link re-setup process in order to reduce overhead, the aforementioned implicit link re-setup method is a method of transmitting the minimum required link re-setup information together with the link switching response. At this time, due to the multi-link characteristics of MLD, (re)association frame exchange is possible with any enabled link of MLD.

Figure 28:
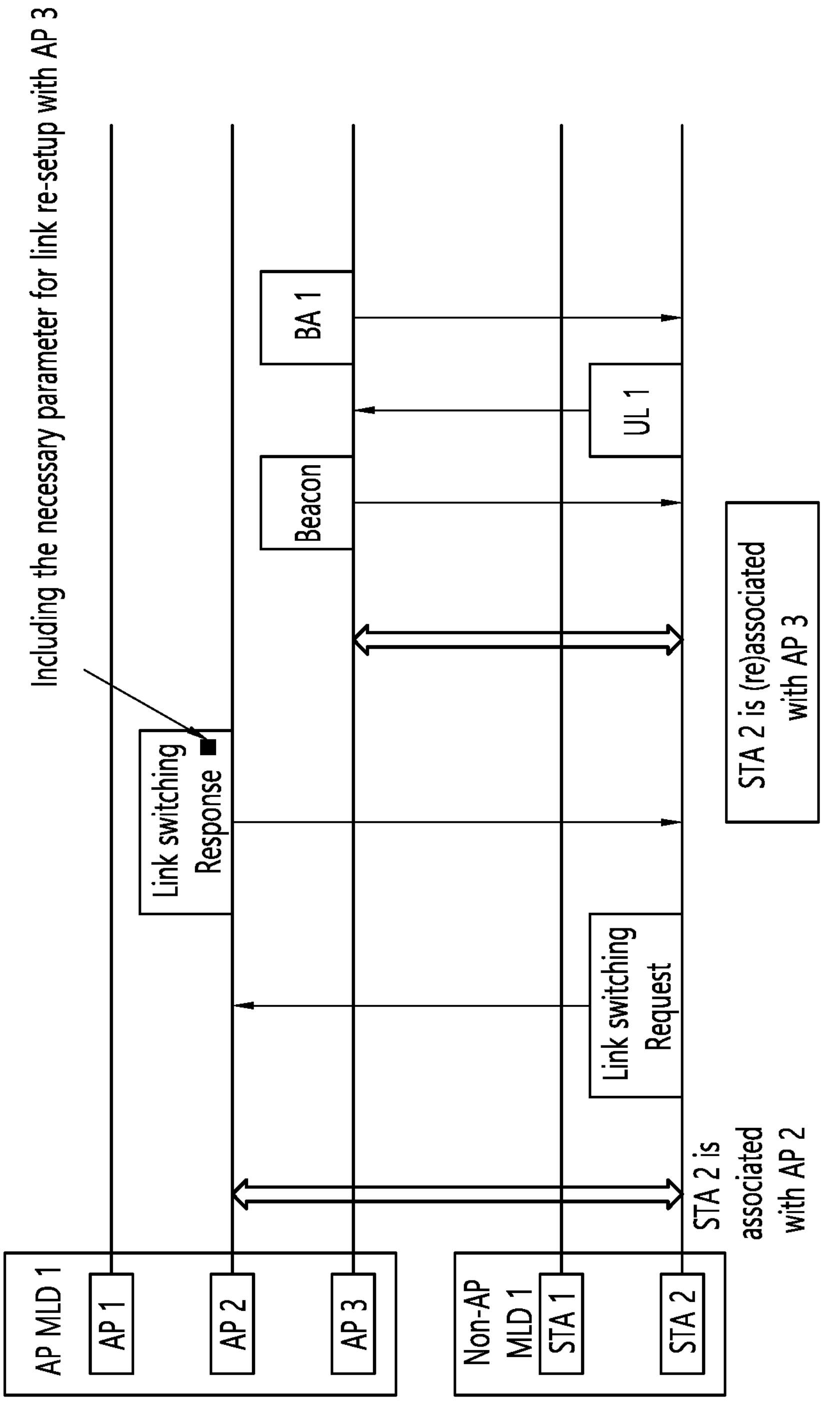
FIG. 28 shows another example of an implicit link re-setup process.
Figure 29:
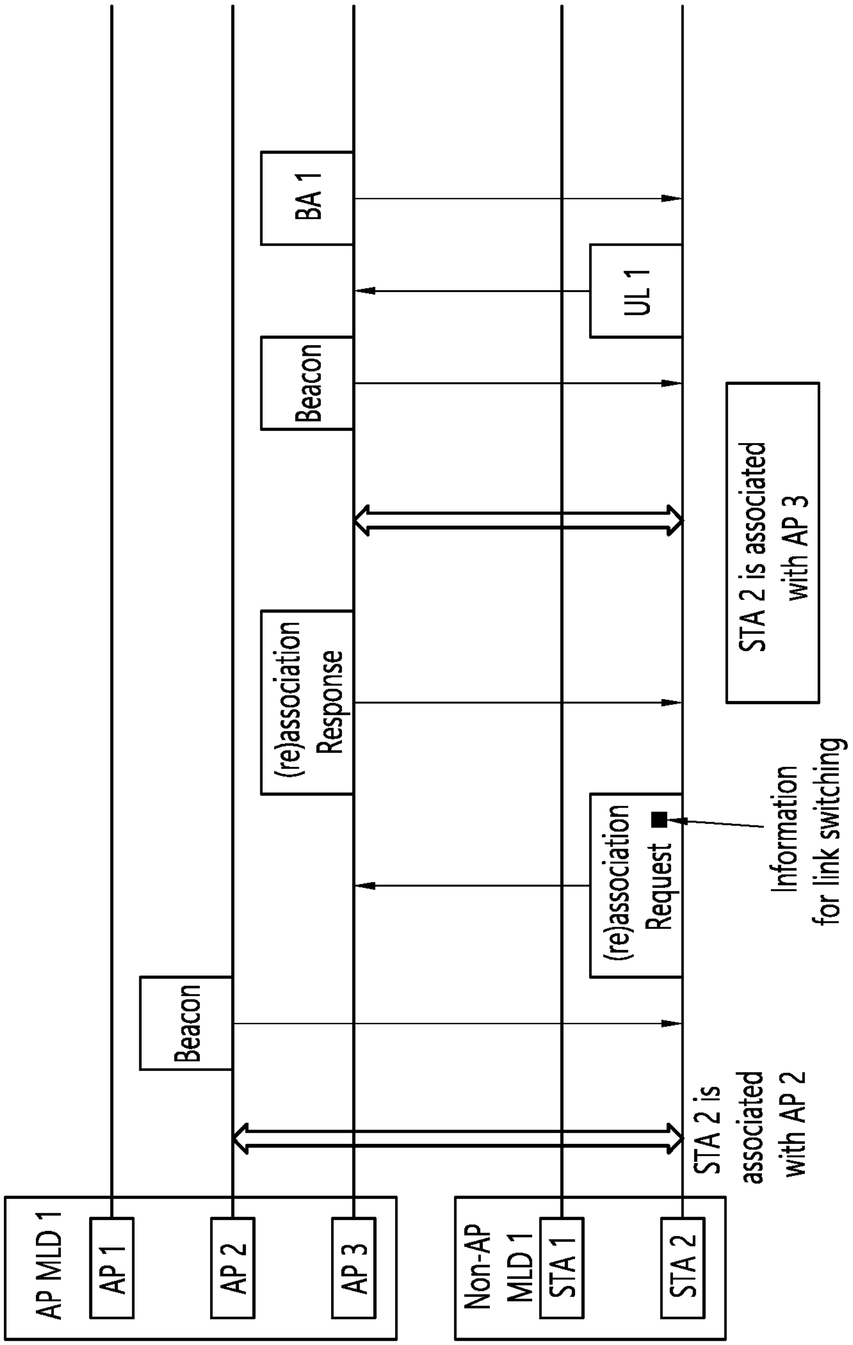
FIG. 29 shows an example of performing link switching with a (re)association frame.

A further embodiment is shown as FIGS. 28 and 29 for illustrative purposes.

FIG. 28 shows another example of an implicit link re-setup process.

FIG. 29 shows an example of performing link switching with a (re)association frame.

Referring to FIG. 29, an STA desiring link switching may perform link switching using an existing (re)association frame without defining a new frame as a frame for link switching.

An STA desiring link switching may perform link switching using an existing (re)association frame. To this end, it is necessary to add an element or field for indication information on the link to be changed to the (re)association request frame. At this time, the added information may include Link identifier information or TID mapping information. Therefore, in the present specification, a frame type in which the following elements or fields are added to an existing (re) association frame is defined in order to simultaneously perform link switching and link reconfiguration.

Link identifier: link identifier. (e.g. Link identifier or BSSID or STAID and channel information of the corresponding BSS, etc.)

TID mapping information: TID mapping information to be applied to the changed link. If this information is omitted, the AP can apply all TIDs as default values for the link or apply the TID mapping information used in the existing link as it is.

Etc.

For example, when STA 2 switches a link from AP 2 to AP 3 and transmits a (re)association request frame including link identifier information indicating AP 3 and TID mapping information as information indicating link switching, upon receiving this, the AP transmits confirmation information in the (re)association response frame. At this time, the response may include additional information indicated for link switching together with existing (re)association attribute information. Due to the multi-link characteristics of MLD, (re)association frame exchange is possible with any enabled link of MLD.

Hereinafter, the above-described embodiment will be described with reference to FIG. 1 to FIG. 29.

Figure 30:
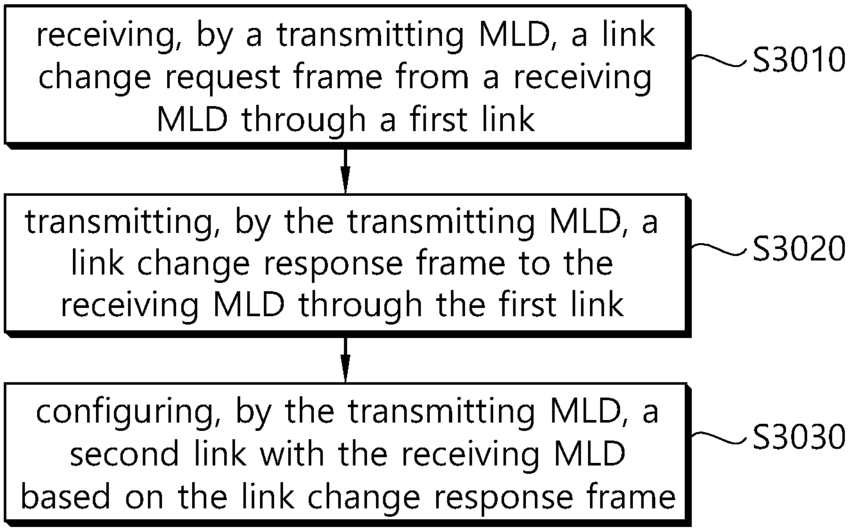
FIG. 30 is a flowchart illustrating a procedure in which a transmitting MLD performs link reconfiguring with a receiving MLD according to the present embodiment.

FIG. 30 is a flowchart illustrating a procedure in which a transmitting MLD performs link reconfiguring with a receiving MLD according to the present embodiment.

The example of FIG. 30 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

The present embodiment proposes a method and apparatus for exchanging link change frames while maintaining existing values for links that have not changed while including information on only the changed links when some links are changed (link switching) between MLDs.

In step S3010, a transmitting multi-link device (MLD) receives a link change request frame from a receiving MLD through a first link.

In step S3020, the transmitting MLD transmits a link change response frame to the receiving MLD through the first link.

In step S3030, the transmitting MLD configures a second link with the receiving MLD based on the link change response frame.

The transmitting MLD includes a first transmitting station (STA) operating on the first link and a second transmitting STA operating on the second link. The receiving MLD includes a first receiving STA whose operating link is changed from the first link to the second link. That is, the first receiving STA operates in the first link when transmitting and receiving the link change request frame and the link change response frame, an operating link is changed from the first link to the second link based on the information included in the link change response frame.

The link change response frame includes information on the first and second links. At this time, the information on the second link is updated, and the information on the first link is maintained without being reset or deleted. Previously, if some links of MLD are changed, not only for the receiving STA where the link change occurs, but also for the receiving STA that does not change the link within the same receiving MLD, some attributes (e.g., status, agreement, assignment) must be reset or deleted and link reconnection must be performed, resulting in inefficiency.

However, the present embodiment proposes a method of performing link change by exchanging minimum frames (or information) between the transmitting MLD and the receiving MLD by updating and including only the information on the changed link while maintaining the existing value of the information on the link that does not change.

The link change response frame may include first information excluding MLD common information exchanged between the transmitting MLD and the receiving MLD. The MLD common information exchanged between the transmitting MLD and the receiving MLD is information having a common value between the MLDs and thus does not need to be exchanged again. Accordingly, link reconfiguration can be performed with minimum information exchange between the transmitting MLD and the receiving MLD, thereby reducing overhead for frame or information exchange.

The first information may include Association Identifier (AID) information to be used in the second link, channel information to be used in the second link, information to be used for synchronization in the second link, and Traffic Identifier (TID) mapping information to be applied to the second link. That is, the first information may be essential information about a link to be exchanged for link reconfiguration.

Information to be used for synchronization in the second link may include time synchronization information or target wake time (TWT) information of the second transmitting STA. The time synchronization information of the second transmitting STA may include time offset, timing synchronization function (TSF) timer accuracy, time stamp, and the like.

The transmitting MLD and the receiving MLD may be in a state in which capability information of all links is acquired before the link change request frame is transmitted. Accordingly, link change is possible only with the information included in the link change response frame without using a separate explicit message or a newly defined frame.

However, an embodiment in which link change is performed using the separate explicit message or the newly defined frame is as follows.

The second transmitting STA may receive a link reconfiguration request frame from the first receiving STA. The second transmitting STA may transmit a link reconfiguration response frame to the first receiving STA. The link reconfiguration request frame and the link reconfiguration response frame may be transmitted and received after the link change response frame is transmitted.

The first link may be removed for the first receiving STA based on the link change request frame and the link change response frame. That is, in the process of exchanging the link change request frame and the link change response frame, the first link may be removed for the first receiving STA.

The second link may be configured for the first receiving STA based on the link reconfiguration request frame and the link reconfiguration response frame. That is, in the process of exchanging the link reconfiguration request frame and the link reconfiguration response frame, the second link may be added to the first receiving STA.

The link reconfiguration request frame may be an association request frame, and the link reconfiguration response frame may be an association response frame. That is, the transmitting MLD and the receiving MLD may perform link reconfiguration using an existing association request/response frame.

The second transmitting STA may transmit a beacon frame to the first receiving STA through the second link. That is, when the operating link of the first receiving STA is changed from the first link to the second link, the second transmitting STA operating in the second link may transmit the beacon frame to the first receiving STA. The first receiving STA may transmit data to the second transmitting STA through the second link.

Figure 31:
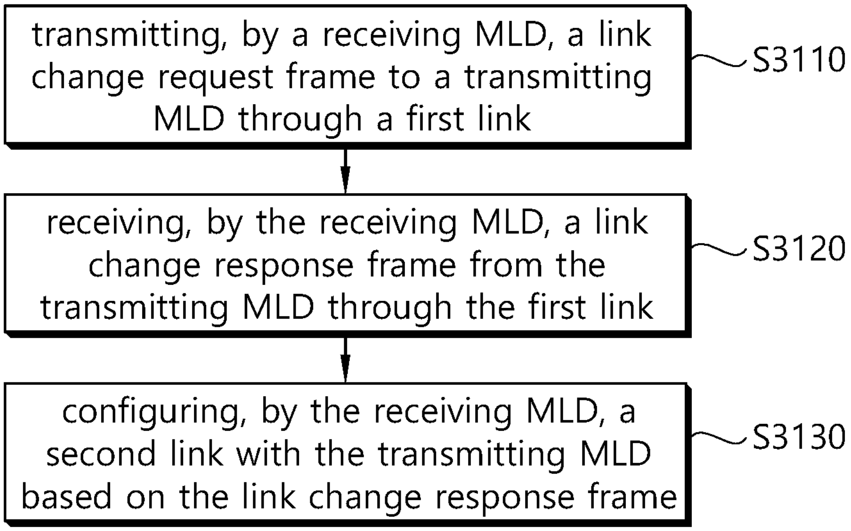
FIG. 31 is a flowchart illustrating a procedure in which a receiving MLD performs link reconfiguring with a transmitting MLD according to the present embodiment.

FIG. 31 is a flowchart illustrating a procedure in which a receiving MLD performs link reconfiguring with a transmitting MLD according to the present embodiment.

The example of FIG. 31 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

The present embodiment proposes a method and apparatus for exchanging link change frames while maintaining existing values for links that have not changed while including information on only the changed links when some links are changed (link switching) between MLDs.

In step S3110, a receiving Multi-link Device (MLD) transmits a link change request frame to a transmitting MLD through a first link.

In step S3120, the receiving MLD receives a link change response frame from the transmitting MLD through the first link.

In step S3130, the receiving MLD configures a second link with the transmitting MLD based on the link change response frame.

The transmitting MLD includes a first transmitting station (STA) operating on the first link and a second transmitting STA operating on the second link. The receiving MLD includes a first receiving STA whose operating link is changed from the first link to the second link. That is, the first receiving STA operates in the first link when transmitting and receiving the link change request frame and the link change response frame, an operating link is changed from the first link to the second link based on the information included in the link change response frame.

The link change response frame includes information on the first and second links. At this time, the information on the second link is updated, and the information on the first link is maintained without being reset or deleted. Previously, if some links of MLD are changed, not only for the receiving STA where the link change occurs, but also for the receiving STA that does not change the link within the same receiving MLD, some attributes (e.g., status, agreement, assignment) must be reset or deleted and link reconnection must be performed, resulting in inefficiency.

However, the present embodiment proposes a method of performing link change by exchanging minimum frames (or information) between the transmitting MLD and the receiving MLD by updating and including only the information on the changed link while maintaining the existing value of the information on the link that does not change.

The link change response frame may include first information excluding MLD common information exchanged between the transmitting MLD and the receiving MLD. The MLD common information exchanged between the transmitting MLD and the receiving MLD is information having a common value between the MLDs and thus does not need to be exchanged again. Accordingly, link reconfiguration can be performed with minimum information exchange between the transmitting MLD and the receiving MLD, thereby reducing overhead for frame or information exchange.

The first information may include Association Identifier (AID) information to be used in the second link, channel information to be used in the second link, information to be used for synchronization in the second link, and Traffic Identifier (TID) mapping information to be applied to the second link. That is, the first information may be essential information about a link to be exchanged for link reconfiguration.

Information to be used for synchronization in the second link may include time synchronization information or target wake time (TWT) information of the second transmitting STA. The time synchronization information of the second transmitting STA may include time offset, timing synchronization function (TSF) timer accuracy, time stamp, and the like.

The transmitting MLD and the receiving MLD may be in a state in which capability information of all links is acquired before the link change request frame is transmitted. Accordingly, link change is possible only with the information included in the link change response frame without using a separate explicit message or a newly defined frame.

However, an embodiment in which link change is performed using the separate explicit message or the newly defined frame is as follows.

The first receiving STA may transmit a link reconfiguration request frame to the second transmitting STA. The first receiving STA may receive a link reconfiguration response frame from the second transmitting STA. The link reconfiguration request frame and the link reconfiguration response frame may be transmitted and received after the link change response frame is transmitted.

The first link may be removed for the first receiving STA based on the link change request frame and the link change response frame. That is, in the process of exchanging the link change request frame and the link change response frame, the first link may be removed for the first receiving STA.

The second link may be configured for the first receiving STA based on the link reconfiguration request frame and the link reconfiguration response frame. That is, in the process of exchanging the link reconfiguration request frame and the link reconfiguration response frame, the second link may be added to the first receiving STA.

The link reconfiguration request frame may be an association request frame, and the link reconfiguration response frame may be an association response frame. That is, the transmitting MLD and the receiving MLD may perform link reconfiguration using an existing association request/response frame.

The first receiving STA may receive a beacon frame from the second transmitting STA through the second link. That is, when the operating link of the first receiving STA is changed from the first link to the second link, the second transmitting STA operating in the second link may transmit the beacon frame to the first receiving STA. The first receiving STA may transmit data to the second transmitting STA through the second link.

The technical features of the present disclosure may be applied to various devices and methods. For example, the technical features of the present disclosure may be performed/supported through the device(s) of FIG. 1 and/or FIG. 11. For example, the technical features of the present disclosure may be applied to only part of FIG. 1 and/or FIG. 11. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 11. For example, the device according to the present disclosure transmits a link change request frame to a transmitting Multi-link Device (MLD) through the first link; receives a link change response frame from the transmitting MLD through the first link; and configures a second link with the transmitting MLD based on the link change response frame.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including transmitting a link change request frame to a transmitting Multi-link Device (MLD) through the first link; receiving a link change response frame from the transmitting MLD through the first link; and configuring a second link with the transmitting MLD based on the link change response frame. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 11. Meanwhile, the CRM of the present disclosure may be the memory 112, 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a non-access point (non-AP) Multi-link Device (MLD) in a wireless local area network (WLAN) system, the method comprising:

transmitting, by a first non-AP station (STA) affiliated with the non-AP MLD, a link change request frame to a first AP affiliated with an AP MLD;

receiving, by the first non-AP STA, a link change response frame from the first AP; and changing, by the first non-AP STA, an operating link from a first link to a second link based on the link change response frame, wherein the first AP operating on the first link and a second AP operating on the second link are affiliated with the AP MLD, wherein the first non-AP STA is affiliated with the non-AP MLD, wherein the AP MLD and the non-AP MLD are in a state in which capability information of all links is acquired before the link change request frame is transmitted, wherein the operating link for the first non-AP STA is changed from the first link to the second link without using a separate explicit message due to the capability information of the all links, wherein the link change response frame includes information on the first and second links and information to be used for synchronization in the second link, wherein the information to be used for synchronization in the second link includes time synchronization information or target wake time (TWT) information of the second AP, and wherein the time synchronization information includes information on time offset, timing synchronization function (TSF) timer accuracy and time stamp.

2. The method of claim 1, wherein the operating link for the first non-AP STA is changed from the first link to the second link by updating the information on the second link while maintaining an existing value of the information on the first link without being reset or deleted, wherein the link change response frame includes first information excluding MLD common information exchanged between the AP MLD and the non-AP MLD.

3. The method of claim 2, wherein the first information includes Association Identifier (AID) information to be used in the second link, channel information to be used in the second link, and Traffic Identifier (TID) mapping information to be applied to the second link.

4. The method of claim 1, further comprising:

receiving, by the first non-AP STA, a beacon frame from the second AP through the second link.

5. A non-access point (non-AP) Multi-link Device (MLD) in a wireless local area network (WLAN) system, the non-AP MLD comprising:

a memory;

a transceiver; and a processor being operatively connected to the memory and the transceiver, wherein the processor is configured to:

transmit, by a first non-AP station (STA) affiliated with the non-AP MLD, a link change request frame to a first AP affiliated with an AP MLD;

receive, by the first non-AP STA, a link change response frame from the first AP; and change, by the first non-AP STA, an operating link from a first link to a second link based on the link change response frame, wherein the first AP operating on a first link and a second AP operating on the second link are affiliated with the AP MLD, wherein the first non-AP STA is affiliated with the non-AP MLD, wherein the AP MLD and the non-AP MLD are in a state in which capability information of all links is acquired before the link change request frame is transmitted, wherein the operating link for the first non-AP STA is changed from the first link to the second link without using a separate explicit message due to the capability information of the all links, wherein the link change response frame includes information on the first and second links and information to be used for synchronization in the second link, wherein the information to be used for synchronization in the second link includes time synchronization information or target wake time (TWT) information of the second AP, and wherein the time synchronization information includes information on time offset, timing synchronization function (TSF) timer accuracy and time stamp.

6. A method performed by an access point (AP) Multi-link Device (MLD) in a wireless local area network (WLAN) system, the method comprising:

receiving, by a first AP affiliated with the AP MLD, a link change request frame from a non-AP station (STA);

transmitting, by the first AP, a link change response frame to the first non-AP STA; and changing, by the first AP, an operating link from a first link to a second link based on the link change response frame, wherein the first AP operating on a first link and a second AP operating on the second link are affiliated with the AP MLD, wherein the first non-AP STA is affiliated with the non-AP MLD, wherein the AP MLD and the non-AP MLD are in a state in which capability information of all links is acquired before the link change request frame is transmitted, wherein the operating link for the first non-AP STA is changed from the first link to the second link without using a separate explicit message due to the capability information of the all links, wherein the link change response frame includes information on the first and second links and information to be used for synchronization in the second link, wherein the information to be used for synchronization in the second link includes time synchronization information or target wake time (TWT) information of the second AP, and wherein the time synchronization information includes information on time offset, timing synchronization function (TSF) timer accuracy and time stamp.

7. The method of claim 6, wherein the operating link for the first non-AP STA is changed from the first link to the second link by updating the information on the second link while maintaining an existing value of the information on the first link without being reset or deleted, wherein the link change response frame includes first information excluding MLD common information exchanged between the AP MLD and the non-AP MLD.

8. The method of claim 7, wherein the first information includes Association Identifier (AID) information to be used in the second link, channel information to be used in the second link, and Traffic Identifier (TID) mapping information to be applied to the second link.

9. The method of claim 6, further comprising:

transmitting, by the second AP, a beacon frame to the first non-AP STA through the second link.

* * * * *